(12) United States Patent
Schneider

(10) Patent No.: US 10,122,242 B2
(45) Date of Patent: Nov. 6, 2018

(54) COMPRESSED AIR ENERGY STORAGE UNIT WITH INDUCTION PUMP AND METHOD FOR THE PRODUCTION OF SUCH A COMPRESSED AIR ENERGY STORAGE UNIT

(71) Applicant: Alexander Schneider, Vienna (AT)

(72) Inventor: Alexander Schneider, Vienna (AT)

(*) Notice: Subject to any disclaimer, the term of this patent is extended or adjusted under 35 U.S.C. 154(b) by 575 days.

(21) Appl. No.: 14/785,415

(22) PCT Filed: Apr. 17, 2014

(86) PCT No.: PCT/AT2014/050095
§ 371 (c)(1),
(2) Date: Oct. 19, 2015

(87) PCT Pub. No.: WO2014/169312
PCT Pub. Date: Oct. 23, 2014

(65) Prior Publication Data
US 2016/0079830 A1    Mar. 17, 2016

(30) Foreign Application Priority Data

Apr. 19, 2013  (AT) .................................. A 329/2013
Feb. 5, 2014   (AT) .................................. A 85/2014

(51) Int. Cl.
*H02K 7/18*  (2006.01)
*F04B 39/00*  (2006.01)
(Continued)

(52) U.S. Cl.
CPC ......... *H02K 7/1876* (2013.01); *F04B 35/045* (2013.01); *F04B 39/0011* (2013.01); *F04B 39/121* (2013.01); *F04B 41/02* (2013.01); *H02K 44/06* (2013.01); *H02K 44/085* (2013.01); *B33Y 70/00* (2014.12); *B33Y 80/00* (2014.12); *F28D 2020/0004* (2013.01)

(58) Field of Classification Search
CPC .... H02K 7/1876; H02K 44/06; H02K 44/085; F04B 35/045; F04B 39/0011; F04B 39/121; F04B 41/02
USPC ........................................................ 290/1 A
See application file for complete search history.

(56) References Cited

U.S. PATENT DOCUMENTS 3,517,229 A    6/1970   Bidard
6,183,206 B1   2/2001   Valenzuela et al.
(Continued)

FOREIGN PATENT DOCUMENTS

DE    19728199 A1    1/1999
EP    1657048 A1     5/2006
(Continued)

*Primary Examiner* — Viet Nguyen
(74) *Attorney, Agent, or Firm* — Laurence A. Greenberg; Werner H. Stemer; Ralph E. Locher

(57) ABSTRACT

A compressed air energy storage unit includes an electrical input and output circuit, a compressor and expansion device and an artificially created compressed air reservoir. The compressor and expansion device includes a piston pump having pistons formed of an electrically and thermally conductive liquid, e.g. galinstan, and is switchable between pumping operation and generator operation. A method for the production of a compressed air energy storage unit of this type includes manufacturing at least some components by 3D printing.

15 Claims, 20 Drawing Sheets

(51) Int. Cl.
*H02K 44/06* (2006.01)
*H02K 44/08* (2006.01)
*F04B 35/04* (2006.01)
*F04B 39/12* (2006.01)
*F04B 41/02* (2006.01)
*F28D 20/00* (2006.01)
*B33Y 70/00* (2015.01)
*B33Y 80/00* (2015.01)

(56) References Cited

U.S. PATENT DOCUMENTS

| | | | |
|---|---|---|---|
| 8,378,521 B2 | 2/2013 | Rufer et al. | |
| 9,038,581 B2* | 5/2015 | Holmes | F02B 71/04 123/46 E |
| 2006/0099287 A1 | 5/2006 | Kim et al. | |
| 2008/0072597 A1 | 3/2008 | Call | |
| 2009/0072545 A1* | 3/2009 | Van Michaels | F03G 6/00 290/1 A |
| 2010/0101231 A1 | 4/2010 | Westmeier | |
| 2011/0020156 A1* | 1/2011 | Van Brunt | F04B 17/04 417/416 |
| 2011/0266810 A1* | 11/2011 | McBride | F04B 17/03 290/1 A |
| 2011/0277457 A1* | 11/2011 | Brun | F04B 35/045 60/408 |
| 2012/0112469 A1* | 5/2012 | Durrett | F01B 11/007 290/1 A |
| 2013/0088018 A1* | 4/2013 | Kobayashi | B60K 6/24 290/1 A |
| 2013/0147205 A1* | 6/2013 | Tucker | F01C 1/103 290/1 A |
| 2015/0108765 A1* | 4/2015 | Choi | F01B 23/10 290/1 A |

FOREIGN PATENT DOCUMENTS

| | | |
|---|---|---|
| EP | 2450549 A2 | 5/2012 |
| RU | 2435041 C2 | 11/2011 |
| WO | 2008139267 A1 | 11/2008 |

* cited by examiner

COMPRESSED AIR ENERGY STORAGE UNIT WITH INDUCTION PUMP AND METHOD FOR THE PRODUCTION OF SUCH A COMPRESSED AIR ENERGY STORAGE UNIT

BACKGROUND OF THE INVENTION

Field of the Invention:

The invention relates to a compressed air energy storage unit having an electrical input and output circuit, compressor and expansion means and an artificially created compressed air reservoir as well as to a method for the production of such a compressed air energy storage unit.

To stop climate change, renewable energy sources should account for a larger share in the energy mix. The problem is, however, that the energy supply from the sun and the wind is not in temporal correspondence with the energy demand. There are not enough economical energy storage systems. Therefore, thermal power plants and nuclear power plants are still in use in order to provide a "control reserve". Hence, there is a need to increase the amount of renewable energy and to reduce the dependence on thermal and nuclear power plants as "control reserve" or "balancing energy", respectively.

To store electrical energy, it has been known to store compressed air and heat. Compressed air energy storage units, which have been implemented so far, make use of geologically suitable subterranean cavities; for this reason, they are limited with respect to site selection, but also with respect to the maximum working pressure. Therefore, artificially created compressed air energy storage units are more advantageous, which allow an essentially higher working pressure. Thus, the energy density is higher, the design is more compact, and site selection is easier. In addition, many of the compressed air energy storage units proposed so far do not store the heat generated during compression or store it only partially, and in generator operation they therefore have to supply heat from outside, e.g. by the combustion of gases, so that the generator does not freeze. This is why the efficiency rates of such compressed air energy storage units are too low to play an important economic role in "energy transition".

The EP 2 450 549 A2 describes a pressure stage heat-storage power plant or energy storage method for temporarily storing energy in the form of pressure energy in a compressible medium and in the form of thermal energy. This technology allows a higher thermodynamic efficiency than former methods, such as are described in DE 2 636 417 A1, DE 2 541 501 A1, DD 118455 A1, DE 2 536 447 B2, DE 2 615 439 A1, DE 3 428 041 A1, EP 364 106 B1, U.S. Pat. Nos. 4,630,436, 4,523,432 and 4,765,142. This higher efficiency is to be achieved by a flexible arrangement of several compressors, several heat exchanger means and several expansion means, which may be connected by numerous pipelines independently of one another in any desired way. What is to turn out to be advantageous is the possibility that the number of compression means may be different from the number of expansion means. In particular, it is supposed to be possible to supply excess energy in the form of electrical, mechanical and thermal energy in an advantageous manner from the outside. In contrast to a comparable arrangement having only one compression stage and one expansion stage, the efficiency is supposed to be increased significantly by the multi-stage arrangement having interconnected heat exchangers. The expansion and compression are carried and to be an adiabatic process, the multi-stage arrangement of heat exchangers and the possibility to feed excess energy from the outside is supposed to minimize the temperature losses or energy losses. A disadvantage is the higher complexity of the plant, which increases the costs of construction and operation. The cost effectiveness of such a plant depends, among other things, on the availability of any excess (thermal) energy.

BRIEF SUMMARY OF THE INVENTION

As far as possible, the present invention is to store the entire heat produced during compression and to use it again during expansion as completely as possible. No additional heat source is provided. The aim is to ensure the best possible efficiency and the most economic operation.

Above all, it is the object of the invention to provide a simple and efficient construction as regards the development of the compressor/expander.

The core of the plant is a piston machine, which works as a pump as well as a generator. The "pistons" consist of a liquid having an electrically and thermally high conductivity, such as galinstan, the "cylinders" are communicating vessels containing the liquid. In pumping operation, the liquid pistons are driven inductively. In generator operation, the compressed air drives the pistons, the pistons overcoming the resistance of an excitation voltage and performing electrical work at the terminals of the coil winding (similar to a magneto-hydrodynamic (MHD) generator). Due to the continuous circulation of the piston liquid, an advantageous heat exchange takes place between the piston displacement and the heat accumulator, which heat exchanger effectively dissipates the heat produced during the compression and prevents freezing of the generator during the expansion.

In detail, the invention accordingly provides a compressed air energy storage unit of the above given type, which is characterized in that the compressor and expansion means comprise a piston pump, whose pistons consist of an electrically and thermally conductive liquid, e.g. galinstan, and which is switchable between pumping operation and generator operation. In particular, electromagnets having a core and coils are provided for inductively driving the conductive liquid. Preferably, the core forms a closed loop, and the loop has a shape deviating from the shape of a circular ring, that is to say it comprises two parallel and straight cylindrical parts, around which the coils are wound. The magnetic core can be designed in such a way that the eddy current losses are minimal and the magnetic energy is maximal, for example, in that the core is made up of parallel, insulated Mu-metal wires.

A gap is left free between the magnetic core and the (excitation) coils, in which the conductive liquid counter—moves up and down in accordance with communicating vessels. Furthermore, it is of advantage here if a partition wall subdivides the gap between the core and the coils into an internal gap located closer to the core and an external gap located closer to the coils, wherein the partition wall terminates at the two upper ends of the parallel core parts, so that the conductive liquid may flow from one gap into the other gap, forming a piston displacement.

The volume of the conductive liquid may be controllable in a cylinder frame of the piston pump, the piston displacement—for example by means of a controller designed in an entirely conventional manner—, the power input being constant during the compressed-air storage process. It is provided with particular benefit that the conductive liquid is connected to a reservoir, the volume of which is variable by means of a reduction pressure transducer and a hydraulic liquid depending on the air pressure in the compressed air energy storage, wherein the hydraulic liquid presses against at least one resilient boundary surface, e.g. a membrane, on the other side of which the reservoir of the conductive liquid is located. The geometric arrangement for controlling the piston displacement, having one or several membrane elements of different size, as well as the spring characteristic(s) of the boundary surface(s) may exactly imitate the necessary non-linearity of the change of volume during the operation.

In generator operation, the pistons of the generator, which consist of the same liquid having a thermally and electrically very good conductivity, are driven by the compressed air, wherein the liquid, i.e. the two pistons induce a voltage in the coils, which is carried to external terminals, to perform the desired electric work there.

The uniform machine, or to be more precise, the piston pump is completely immersed in a liquid, e.g. water, acting as heat accumulator. In operation, a circulating pump may constantly circulate the conductive liquid in a closed circulation, wherein the heat exchange takes place between the conductive liquid and the heat accumulator.

In operation, it follows that two pistons are provided in U-shaped communicating vessels and are connected to one another; as mentioned, said pistons being formed by the conductive liquid, and alternately one piston is lifted, while the other piston is lowered, the entire piston volume being constant during a working period.

Furthermore it is of particular advantage if one respective induction circulating pump below each of the two core parts in each half-stroke periodically and synchronously sucks off conductive liquid from the external gap and inductively drives it through the heat exchanger and finally pushes it back into the internal gap.

Furthermore, it is favorable if the reservoir controlling the volume of the conductive liquid simultaneously acts as heat exchanger, wherein three disk-shaped arched chambers are disposed adjacent each other, i.e. a middle chamber, to which the hydraulic liquid is supplied, and on both sides thereof, separated from it by resilient membranes, two reservoir chambers exist, which are each defined by an outwardly arched wall made of a material having a good thermal conductivity and a high-temperature resistance, e.g. borosilicate glass.

Furthermore, it is favorable if the circulating pumps pump in the conductive liquid at the lower end of the heat exchangers, wherein on the upper end the cooled conductive liquid or the conductive liquid heated in the generator operation is fed back again to the piston pump via a pipeline.

To form the heat exchanger, it is favorable if the conductive liquid is directed through a helical heat exchanger pipeline made of a thermally conductive and high-temperature resistant material, e.g. borosilicate glass, within a heat accumulator, possibly within the liquid heat accumulator.

For optimal use of the heat energy, it is also favorable if a pressure pipeline extends, e.g. meanders, between the compressed air reservoir and the piston pump through a heat accumulator, wherein thermal energy is transferred from the compressed air into the heat-accumulating medium or vice versa.

For a compressed-air control, it is advantageous if a pressure valve and a suction valve in the form of concentric rings enclose the magnetic core. Here it is further favorable if the air chamber above the suction valve is connected to the surroundings by means of a pipeline extending through a heat accumulator. The pipeline extends out of the heat accumulator on the upper side.

To obtain a particularly high degree of efficiency, it is also of advantage if the compressed air reservoir as well as, as the case may be, the heat accumulator and the pressure pipeline are surrounded by a thermally insulating layer.

In the present system or compressed air energy storage unit the noise emission is reduced, among other things, by obtaining sound insulation by the surrounding heat-accumulating liquid. Additional sound insulation is also obtained in that the heat-insulating layer is surrounding the heat accumulator, i.e. the heat-accumulating liquid from all sides. In addition, it may preferably be provided that the internal face/side of the pipeline leading to the surroundings is provided with a sound-damping coating.

It is also of particular advantage if all mechanically fixed parts, with the exception of the coils, the core and a magnetic valve control, are made of an electrically non-conductive material, e.g. ceramics, to minimize the eddy current losses and demagnetization losses; accordingly, the suspension of the machine, the frame, may also be made of such an electrically non-conductive material, such as in particular ceramics.

As mentioned, an electric capacitor is provided for the voltage output, which capacitor is preferably designed as a plate capacitor having comb-like meshing plates, which are separated by a suitable dielectric, e.g. ceramics, glass or plastics, and are spaced apart such that an electric strength of 220 kV is obtained for the capacitor, wherein, when combined with the coils, a resonance frequency of 50 Hz is obtained.

The present compressed air energy storage unit has a simple construction, for it essentially comprises for the core only a singular machine, which is simultaneously motor, compressor, expander and generator. This single machine does the same job, for which, according to EP 2 450 549 A2, nine machines are required. In addition, the present invention has a simpler operation, wherein apart from the valves it does not comprise any components subject to wear. The present invention allows (assuming that all processes are performed in a loss-free manner) to approximate the thermodynamic efficiency anywhere close to 100%, however, at the expense of power input or power output. During the circulation of the piston liquid, the liquid piston improves the heat transfer between the compressed air in the piston displacement and the surroundings of the piston displacement. In the present invention, the compression/expansion is not a merely adiabatic process, such as is the case in EP 2 450 549 A2, but a polytropic one. By means of suitable fine adjustment of the piston displacement as a function of the storage pressure (for instance by varying the entire amount of piston liquid in the system or by supplying/carrying off hydraulic liquid from/to the outside), the dwell time of the compressed air in the piston displacement may be varied in any desired way. Each differential volume element of the amount of air to be compressed/expanded may be compressed/expanded not only once, but n- times before being discharged to the storage or to the atmosphere. The higher the value selected for n, that is the longer the gas remains in the piston displacement, the more often it may exchange heat with fresh, circulated piston liquid. The higher the value selected for n, the closer the polytropic characteristic curve approaches an isotherm. It has been known that isothermal compression and expansion are equivalent to an efficiency equaling 100%. The higher the value selected for n, the lower the energy exchange between the piston displacement and the surroundings per piston stroke, the lower the "yield" of the amount of compressed air stored per piston stroke, the longer it takes to charge/discharge the storage. In the case of a high value for n, there will be a high degree of thermodynamic "reactive power", oscillating back and forth in the system between the pistons or oscillating back and forth between maximum pressure energy in the gas (air) and maximum kinetic energy in the piston. In addition, the heat transfer/efficiency may also be improved by increasing the piston area in proportion to the piston displacement. The invention of the present type allows to adjust the optimum operating point by means of a fine adjustment of some parameters, in terms of maximum cost effectiveness. An optimum compromise between performance and efficiency is also determined by the prices on the electricity exchange. The invention allows to newly adjust the respective optimum operating point in case of changing electricity prices.

The object according to the invention is also solved by an above cited method for the production of an above described compressed air energy storage unit, wherein at least some or all of the components are manufactured by 3D printing, the 3D printer being charged with a mixture of ceramic powder and ceramic fiber pieces at variable mixing ratios.

Advantageously, the compressed air energy storage unit is manufactured in a compact and self-supporting design.

Here it is of advantage if the two circulating pumps are replaced by a centrally arranged compact circulating pump, which is firmly attached to the main pump and which simultaneously fulfills a mechanical supporting function.

The magnetic cores of main pump and circulating pump are preferably not wound but potted in cavities of the compact component, wherein the cavities have in particular a star-shaped cross-section and the formation of air bubbles is reduced by applying a vacuum in the cavity.

Several layers of fibers or ropes can be wound around the pressure-carrying parts to improve the strength, and subsequently these fibers or ropes can be potted in a hardening matrix or be sheathed with a hardening matrix.

To wrap the pressure-carrying parts, a coiling machine designed specifically for this purpose may be used.

The device for switching between pumping operation and generator operation is preferably arranged above the valves, so that it is possible to wrap both the switching device and the machine with fibers in the area of the piston displacement and the valves.

By having improved the displacement controller, wrapping with fibers is possible.

Advantageously, four main pillars are arranged at the outer edge to support the plant and carry the helical heat exchanger.

The helical heat exchanger is preferably made of pieces consisting of quarter circle segments. Said quarter circle segments are each sheathed with a tube made of fibrous tissue and then with a hardening matrix, prior to being inserted in appropriate apertures on the four main pillars and being firmly attached, e.g. welded thereto.

Advantageously, a device for supplying and discharging air to/of the piston displacement controller is arranged. Said device for supplying and discharging air has a similar function as the switching device.

In accordance with a further feature of the invention, the piston displacement controller is arranged above the machine. The following advantages are achieved thereby:
- Due to the lower specific weight, the hydraulic liquid floats directly on the piston liquid and does not mix with it.
- The mixing ratio of ceramic powder and ceramic fiber pieces may be varied in the 3D printer, in particular, for the manufacture of the piston displacement controller: For example, the printer may be charged to the upper rim of the pump with ceramic powder only, to obtain surfaces as smooth as possible, and above that with a mixture of ceramic powder and fiber pieces, to obtain a ductile element having a higher elongation at break.

If heat exchanger fins are used in the piston displacement, the heat exchange between the gas and the atmosphere in the piston displacement may be improved and the efficiency can be increased by approaching the isothermal process.

When winding the electric coils, a movable bobbin preferably rotates in a fixed frame or on a plane base. A small air gap exists between the bottom of the bobbin and the fixed frame, wherein ceramic balls carrying the bobbin are rolling during the winding process. The fixed frame comprises a circular groove, in which the balls are rolling. After the end of the winding process, the air space between the bobbin and the frame including the balls is filled with a hardening matrix (e.g. concrete). Teeth may be provided on the outer circumference of the bottom of the bobbin, so that the winding maytake place with the aid of a gear drive.

BRIEF DESCRIPTION OF THE SEVERAL VIEWS OF THE DRAWING

The invention will now be described by way of non-limiting preferred embodiments and with reference to the accompanying drawings, in which:

FIG. 1A is an associated electric equivalent circuit diagram;

DESCRIPTION OF THE INVENTION

Figure 1:
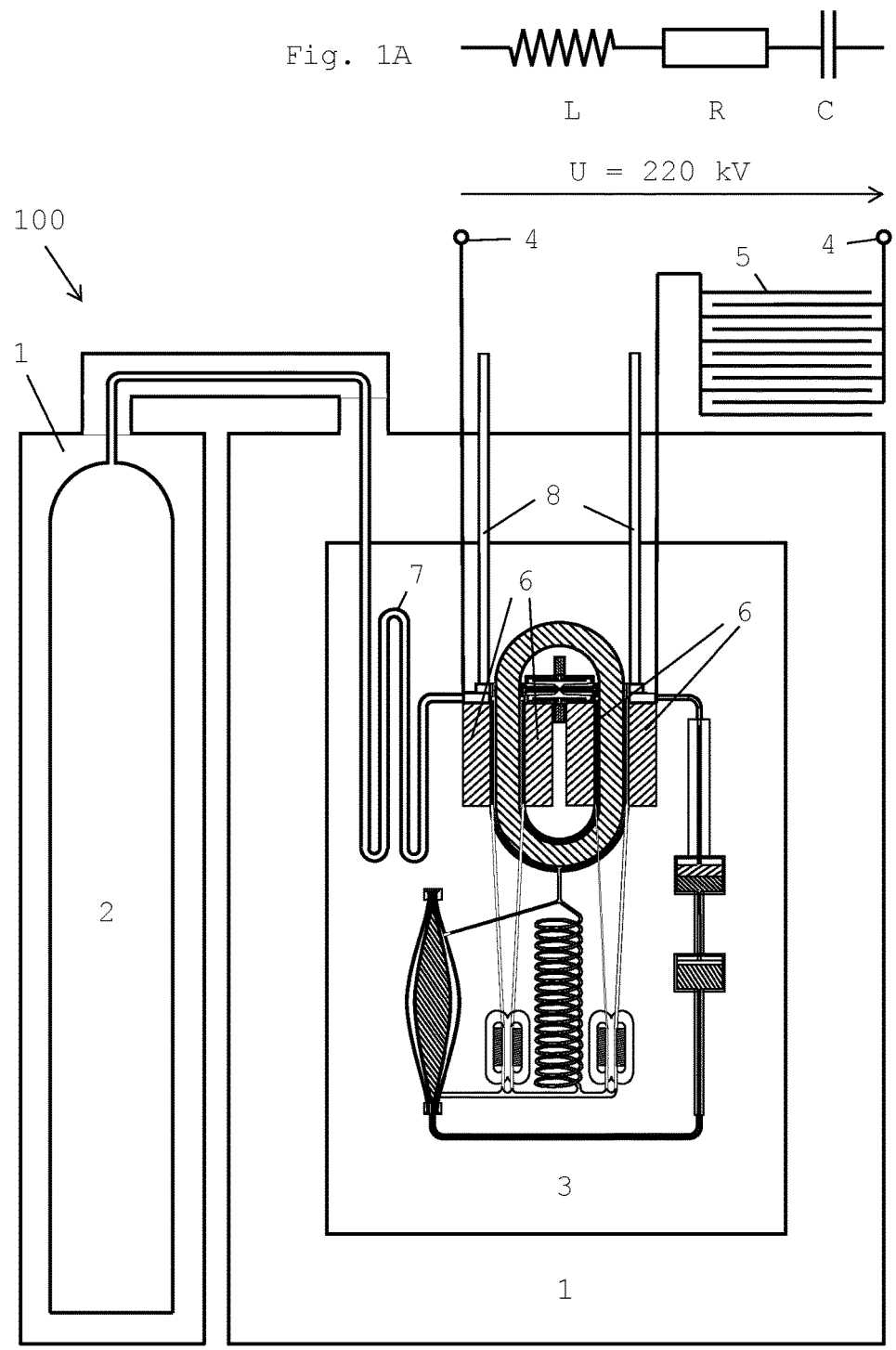
FIG. 1 is a schematic view of the entire compressed air energy storage unit.

FIG. 1 schematically shows an example of a compressed air energy storage unit 100 comprising a piston pump 200 exerting the function of a compressor and an expander: A thermally insulating layer 1 surrounds a (an artificial) compressed-air storage 2 and a heat-accumulating liquid 3, which e.g. is water. The piston pump 200 is immersed in the liquid and surrounded by it on all sides.

In terms of electrical engineering, an RLC series resonant circuit is provided; cf. FIG. 1A. A 220-kV alternating voltage U is applied to external terminals 4 as input and output circuit. The capacity C is formed by a capacitor 5, which is arranged outside the thermally insulating layer 1. The capacitor 5 is designed as a laminated plate capacitor having an electric strength, which is considerably higher than 220 kV. The plates of the capacitor 5 are connected such that the poles of the capacitor 5 inter-mesh with each other in a comb-like manner and the dielectric fills a meander-like space between the electrodes. The inductivity L is formed by a coil-shaped winding 6 of the piston pump 200. The electric active resistance R results from the mechanical work performed during the compression of air. The inductivity L of the coil 6 and the capacity C of the capacitor 5 are dimensioned such that the resonance frequency corresponds to the mains frequency of 50 Hertz (or, as the case may be, 60 Hertz, e.g. in the United States).

Thus, the compressed air energy storage unit 100 works without any voltage transformation directly with a 220 kV alternating voltage at input/output 4, for which purpose it is favorable if all parts, in particular the coil winding 4, are carefully double-insulated and designed in a water-tight manner.

The compressed air flows through a pressure pipeline 7 between the piston pump 200 and the compressed air reservoir 2. To optimize the heat exchange, the pressure pipeline 7 is designed in a meander-like manner in the heat exchanger 3. A pipeline 8 connects the piston pump 200 to the ambient air. To minimize noise emission, the interior of the pipeline 8 leading to the outside may be coated with a sound-damping material. In addition, the heat accumulator 3 and the heat insulation 1 simultaneously act as a sound damping.

Figure 2:
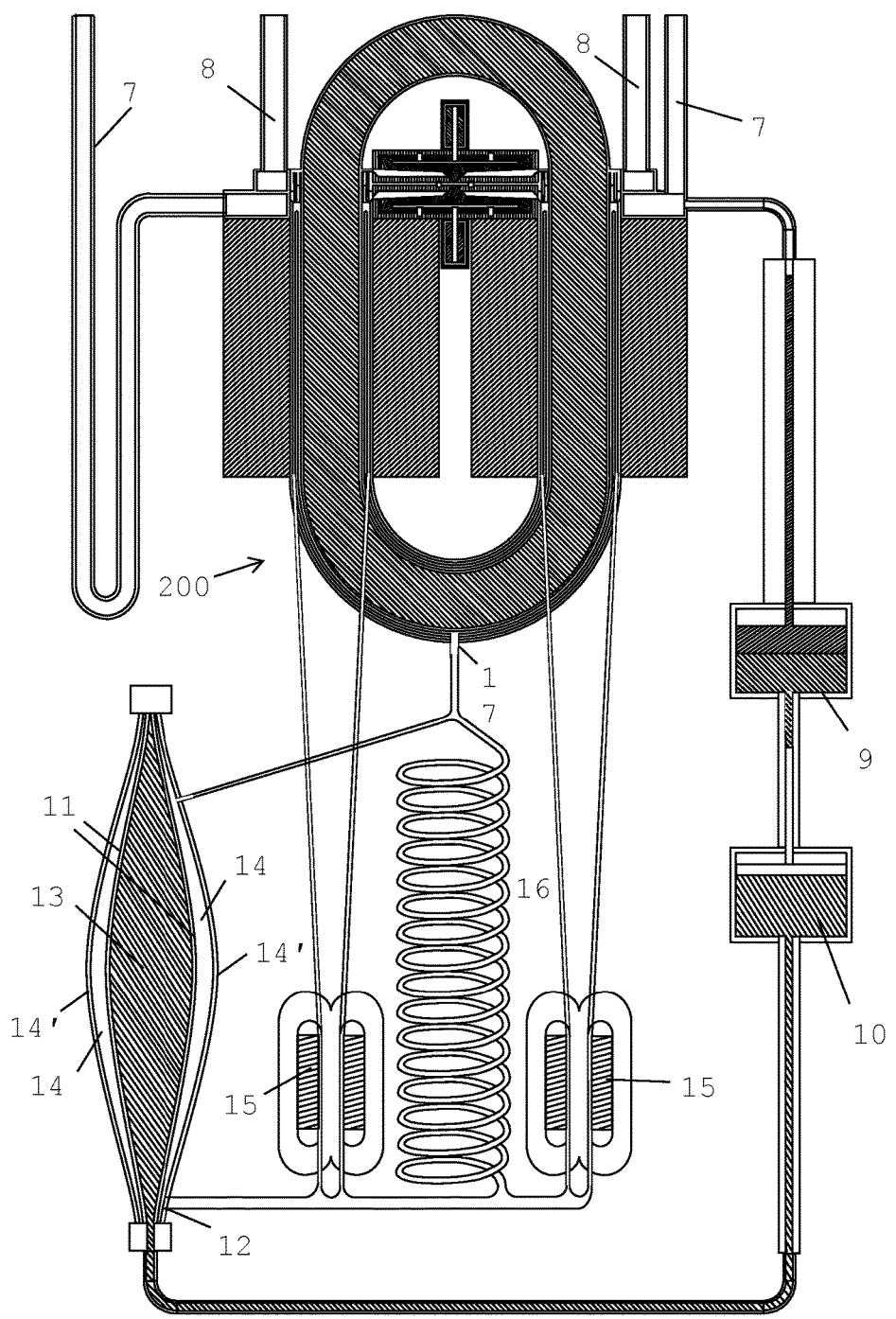
FIG. 2 is a schematic view of a piston machine ("induction pump") of the compressed air energy storage unit with its peripheral components such as piston displacement controller and heat exchange circulation.

FIG. 2 is a schematic view of the piston pump 200 including all of its peripheral components. A pressure transducer 9 converts the working pressure of the compressed air (pressure pipeline 7) proportionally to the pressure of a hydraulic liquid 10, which passes the pressure onto two membrane springs 11. The membrane springs 11 subdivide a disk-shaped element 12 into an inner (middle) region 13 and two outer regions 14 (right and left of the middle region 13).

Two small circulating pumps 15 are located below two legs of the piston pump 200. These circulating pumps 15 drive a piston liquid, which still is to be described in more detail, through a heat exchanger circuit, which continues the right leg and the left leg of the piston pump 200 in a straight line downwards, leads through the circulating pumps 15 and then branches off into two conduits: One branch extends bottom-up through the outer region 14 of the disk-shaped element 12. The other branch extends upwards through a helical heat exchanger 16. Above the two elements 12 and 16, the two conduits or branches merge into one conduit, which centrally re-enters the piston pump 200 at a lower vertex 17 of the piston pump.

Figure 3:
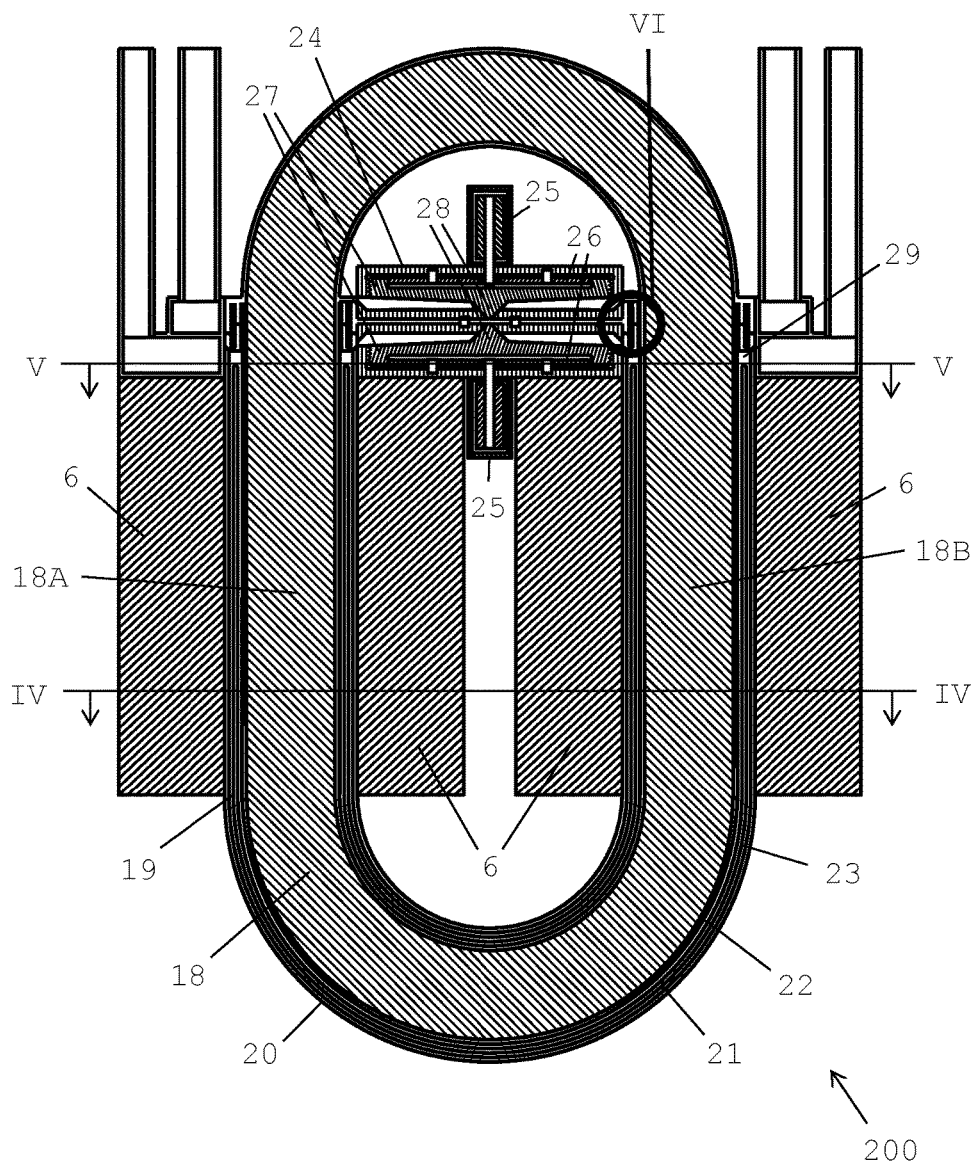
FIG. 3 is a schematic view of this piston machine ("induction pump") in enlarged form and without peripheral components.
Figure 4:
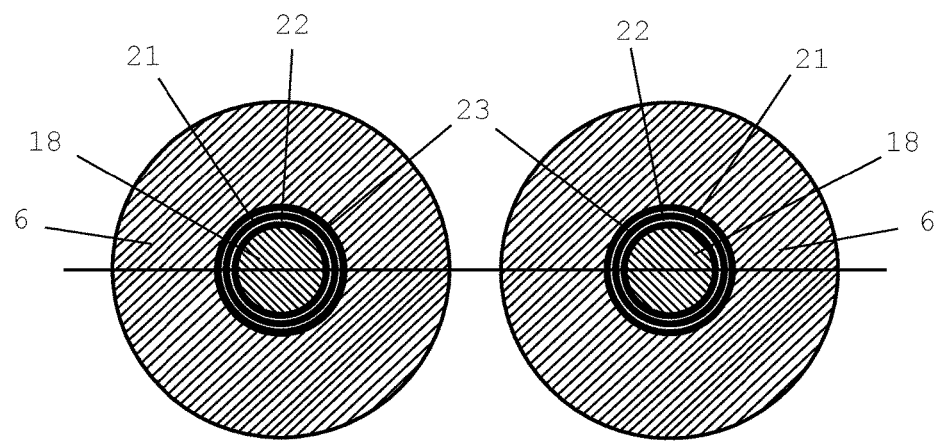
FIG. 4 is a cross-section of the soft-magnetic core, the coil winding and the inner and outer air gaps of this piston machine, in accordance with line IV-IV in FIG. 3.

FIG. 3 is an enlarged view of the piston pump 200 without any peripheral components: It comprises a soft-magnetic core 18 in the form of a cut-open torus, in which two parallel parts, i.e. cylinder parts 18A, 18B are inserted. The elevation of the core 18 shown in FIG. 3 has the form of a stadium. The core 18 is constructed in such a way that any eddy current losses are minimal, e.g. in the form of parallel insulated Mu-metal wires or made up of a layered transformer plate. Moreover, the core 18 is constructed in such a way that the magnetic flux reaches a maximum and the magnetic resistance reaches a minimum, i.e. for example without any joints or air gaps in the direction of the magnetic flux. The cylinder-shaped parts 18A, 18B of the core 18 are wrapped with insulated wire to form the coils 6. An annular gap 19 is located between the core 18 and the coils 6. The two coils 6 are connected by a U-shaped tube 20 concentrically surrounding the magnetic core 18. The air chamber 19 between the coils 6 connected in U-shaped manner and the core 18 is subdivided by a partition wall 21 into an internal gap 22 located closer to the core 18 and an external gap 23 located closer to the bobbin; cf. also FIG. 4. These two gaps 22 and 23 define two concentric communicating vessels.

Figure 5:
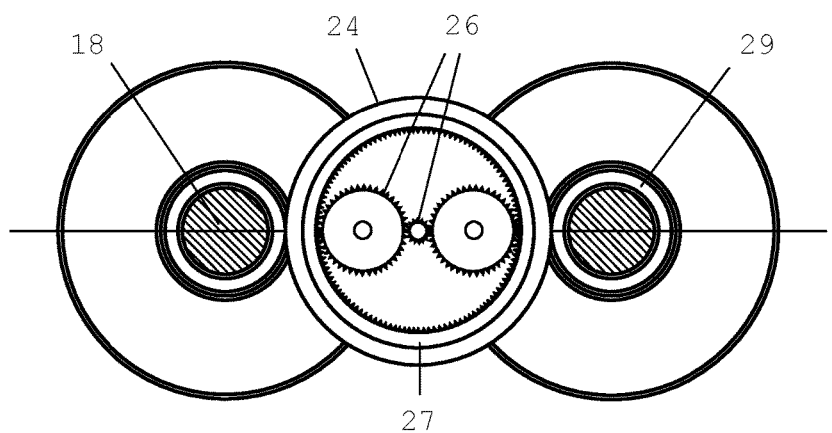
FIG. 5 is a cross-section of the soft-magnetic core, the piston displacement and the planetary gear train of that device of the piston machine which switches between pumping operation and generator operation, in accordance with line V-V in FIG. 3.

Between the parallel parts 18A, 18B of the core 18 above the bobbin 6, there is located a switching device 24 comprising two servomotors 25, each driving a disk 27 via a planetary gear 26; cf. also FIG. 5; each disk 27 has a frusto-conical projection 28 at the center and a thread on the outer surface, which glides in an internal thread of the housing of the switching device 24.

Figure 6:
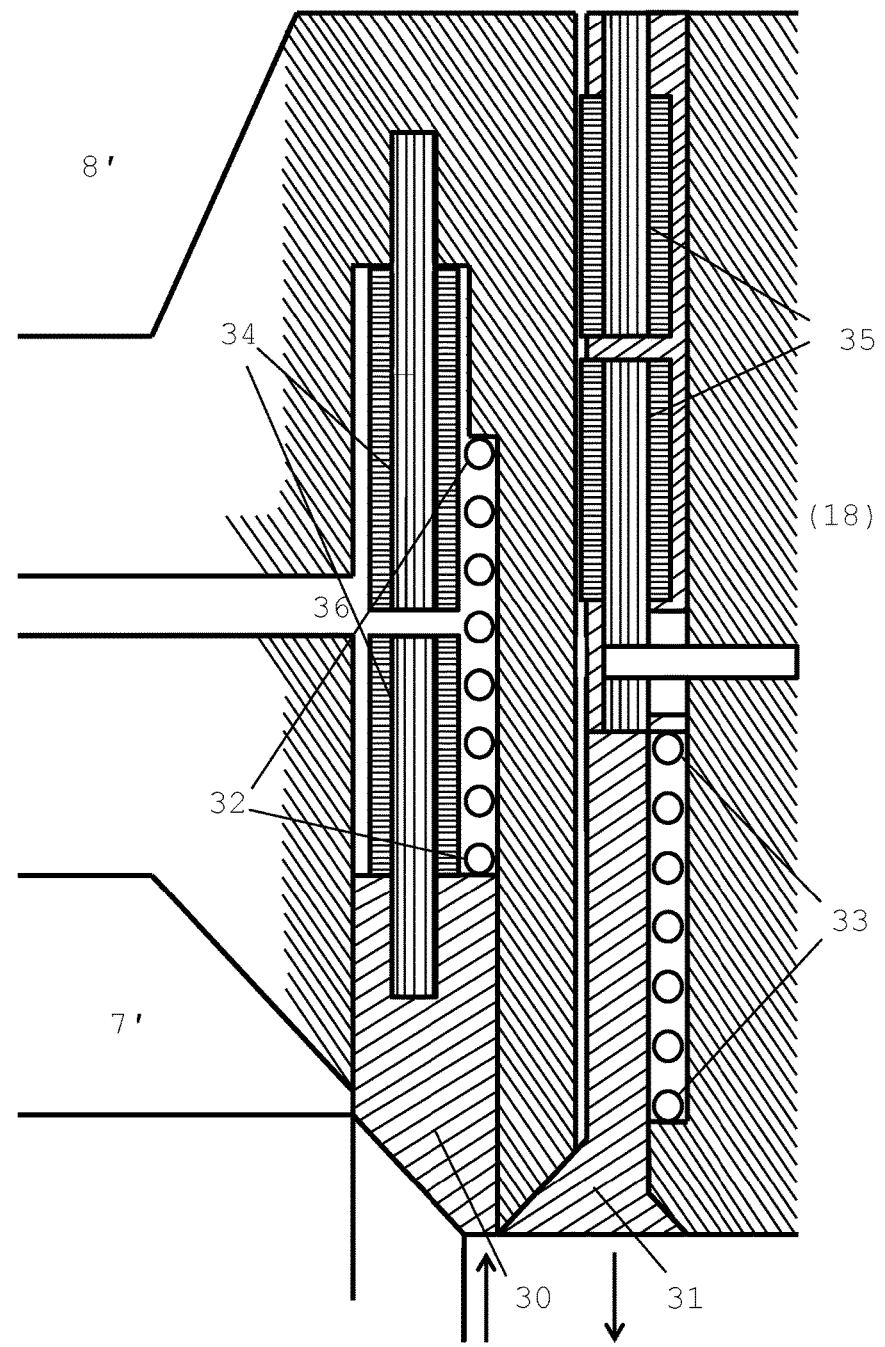
FIG. 6, in a detail VI according to FIG. 3, is an enlarged longitudinal section of a pressure and suction valve including springs and control magnets, wherein both valves are closed.

FIG. 6 is an enlarged view of a detailed area (cf. detail VI in FIG. 3) of the piston pump 200: a piston displacement 29 of the piston pump 200 (cf. FIG. 3) is closed at the top by two valves, i.e. a pressure valve 30 and a suction valve 31. Both valves 30, 31 are designed as concentric rings around the magnetic core 18. Both valves 30, 31 are kept closed each by the force of a spring 32 or 33, respectively. The spring 32 keeps the pressure valve 30 closed, the spring 33 keeps the suction valve 31 closed. Both valves 30, 31 carry several annularly arranged electromagnets 34 or 35, respectively, which are able to open the valves 30, 31 against the spring force. The electromagnets 34 open the pressure valve 30; the electromagnets 35 open the suction valve 31.

Figure 7:
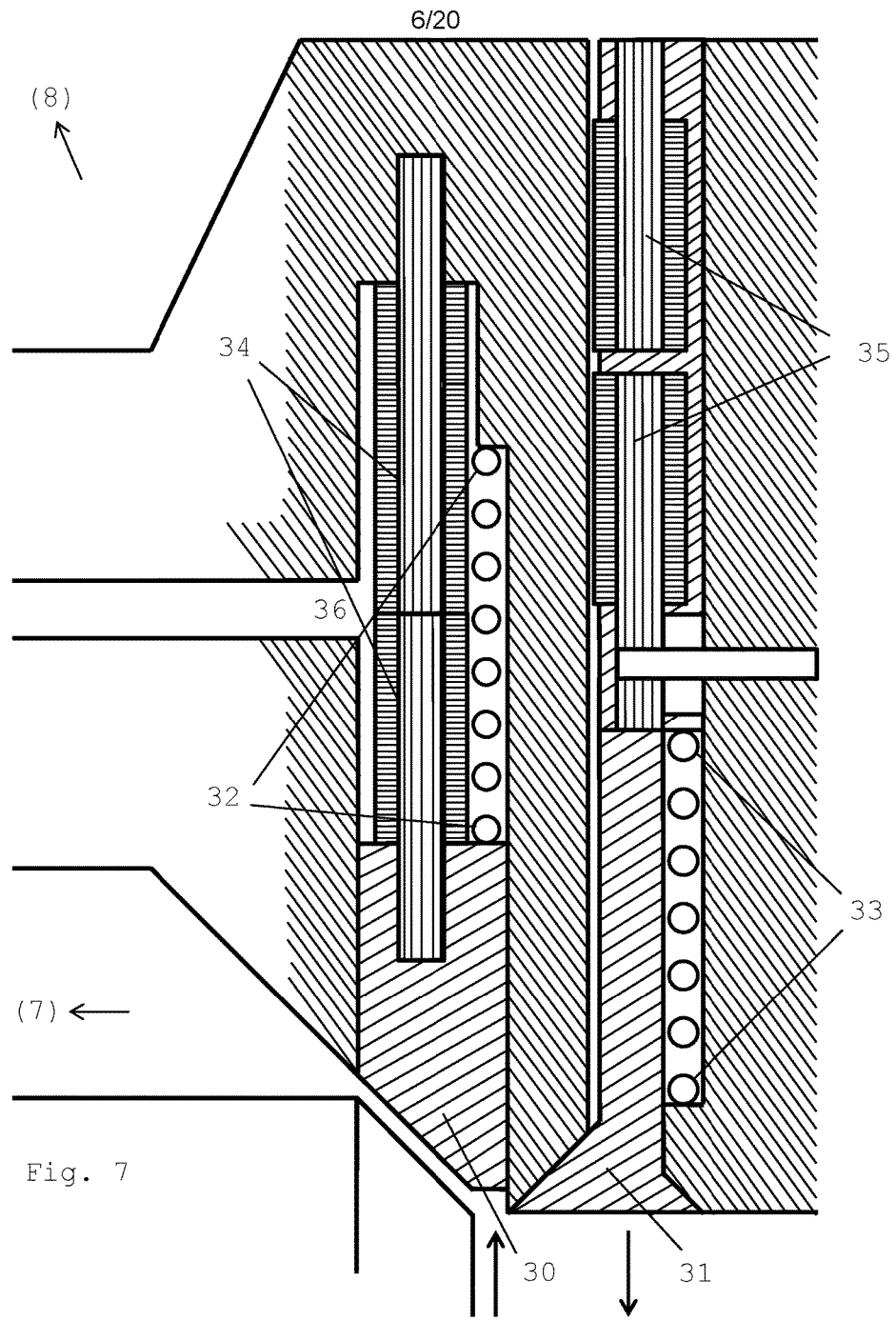
FIG. 7 is a view like FIG. 6, however, with an open pressure valve.

FIG. 7 shows the pressure valve 30 in opened position: The piston displacement 29 is connected to the compressed-air storage 2, as is indicated by arrow (7), pointing to the pressure pipeline.

Figure 8:
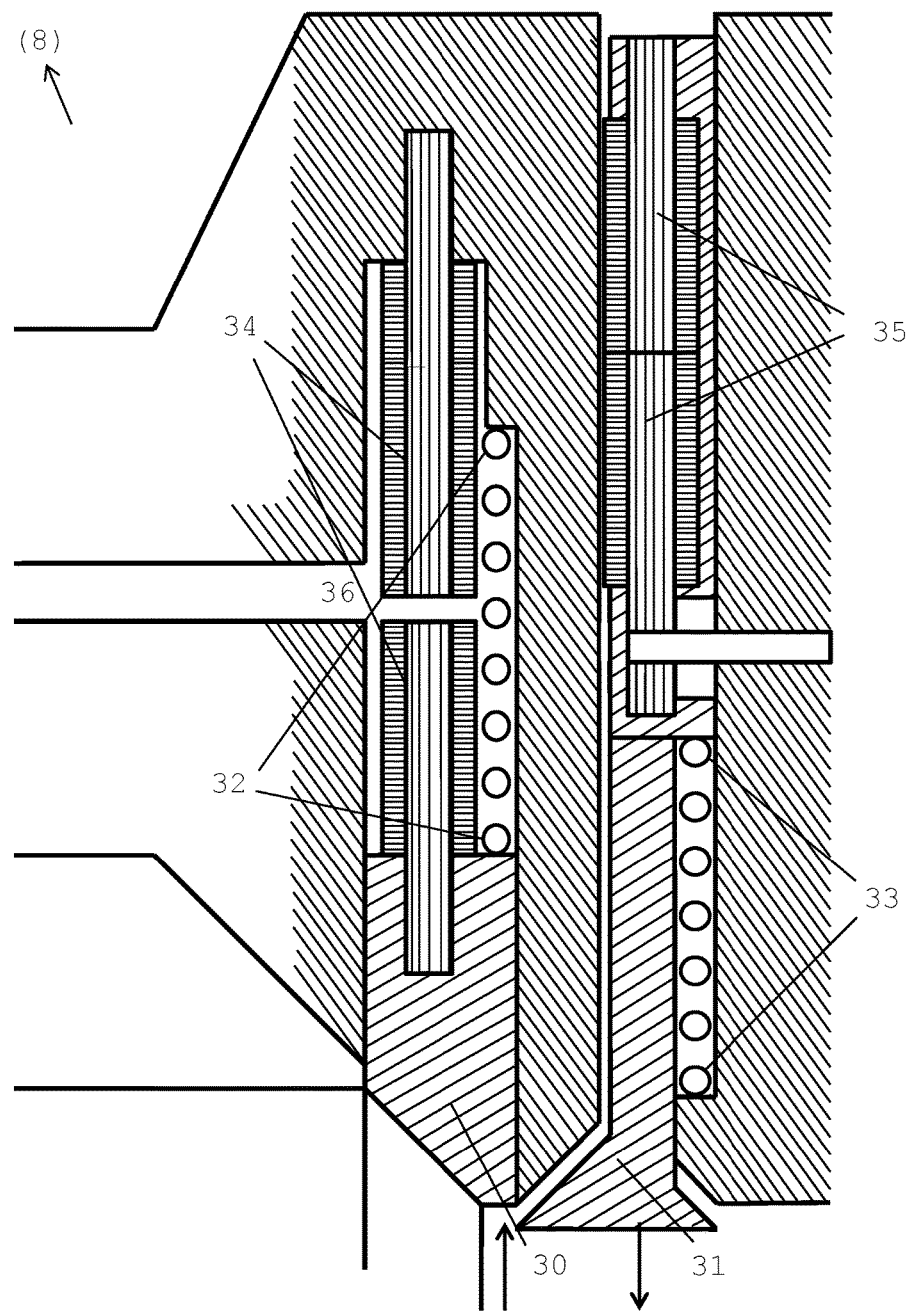
FIG. 8 is a view like FIG. 6, however, with an open suction valve.

FIG. 8 shows the suction valve 31 in opened position: The piston displacement 29 is connected to the ambient air (arrow 8); cf. pipeline (3).

Figure 9:
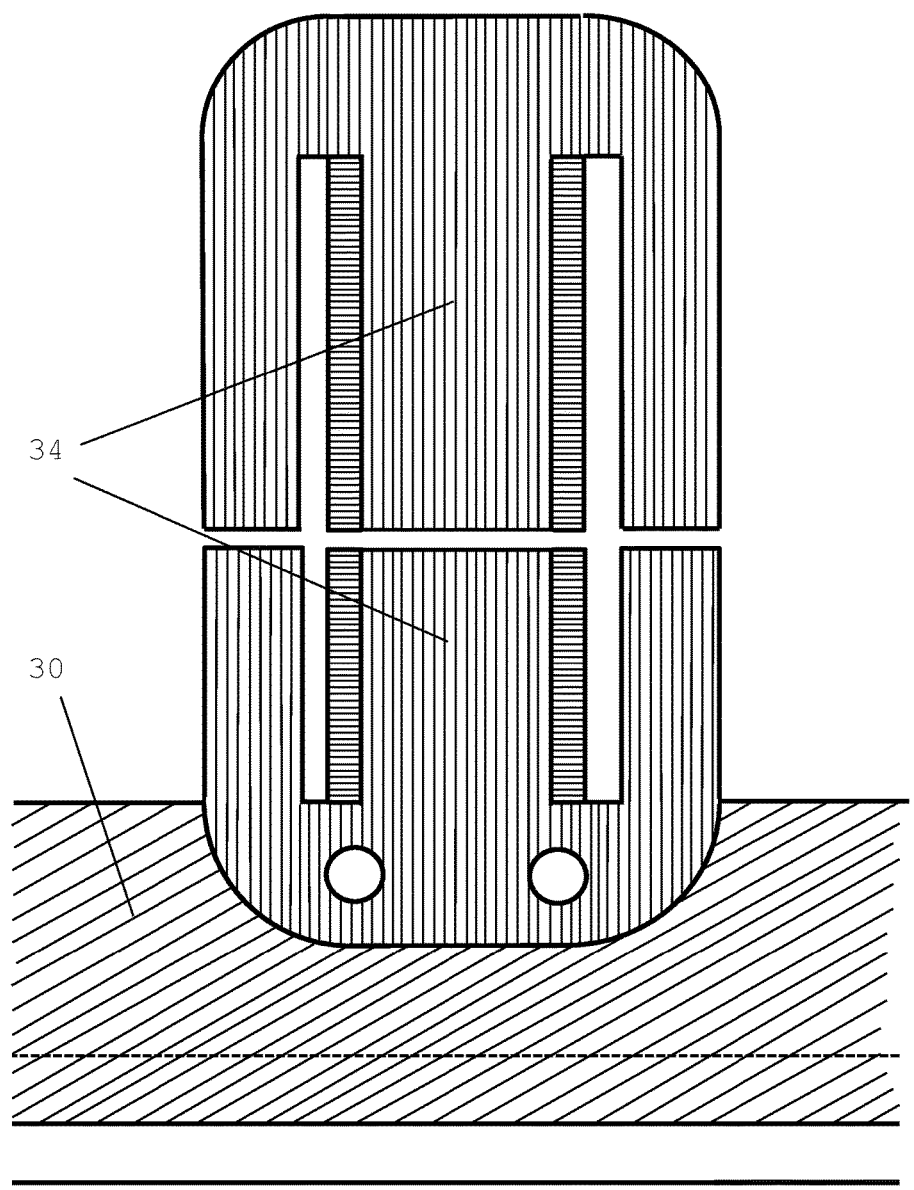
FIG. 9 is an enlarged longitudinal section of the pressure valve including control magnets, the view being rotated by about 90° as compared to FIG. 6.

FIG. 9 is an inside view or projection of a part of the pressure valve 30, so that the shape of one of the annularly arranged electromagnets 34 is visible. The viewing direction is rotated by 90° as compared to FIG. 6, i.e. radially from inside to outside.

Figure 10:
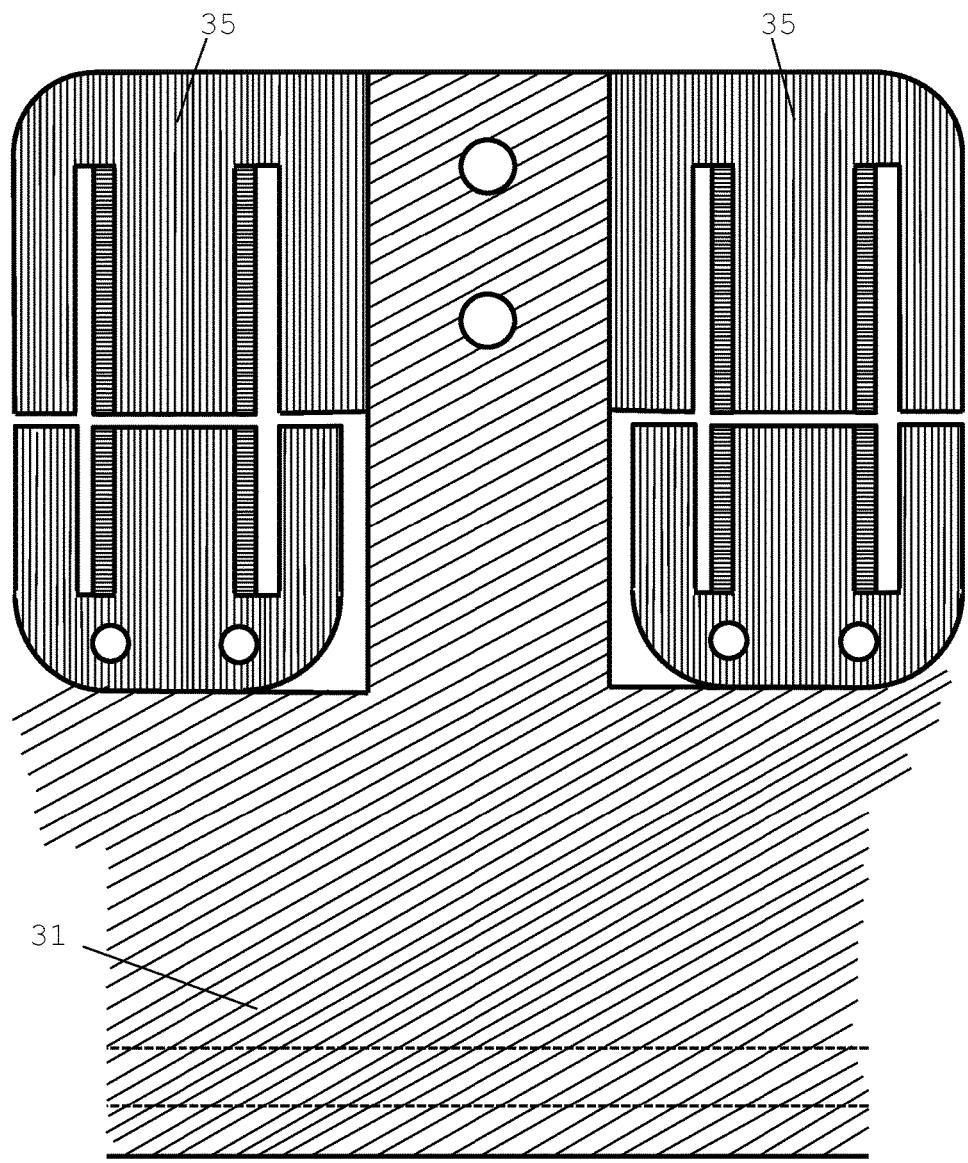
FIG. 10 is an enlarged longitudinal section of the suction valve including the control magnets, the view being rotated by about 90° as compared to FIG. 6.

FIG. 10 shows a part of the suction valve 31 in projection, so that the shape of two of the annularly arranged electromagnets 35 is visible. The viewing direction is rotated by 90° as compared to FIG. 6, i.e. also radially outwards.

Following the above basic illustration of the construction of the present compressed air energy storage unit 100, below will follow a description of the operation of the compressed air energy storage unit 100, other constructive details resulting.

The gap 19 between the coils 6 and the core 18 (cf. FIG. 3) is filled with the thermally and electrically conductive liquid, e.g. galinstan. In idle state, the liquid level is identical in both legs of the communicating tubes (in accordance with the core parts 18A, 18B).

One end of the one coil 6 is connected to one end of the other coil 6, so that the two coils 6 together form a single winding around the magnetic core. The magnetic fluxes of the interconnected coils 6 through the core 18 always extend in the same direction, either in a clockwise direction or a counterclockwise direction. An alternating voltage of 220 kV having a frequency of 50 Hertz is applied to the two terminals 4 (FIG. 1). Said alternating voltage induces a magnetic field and an associated magnetic flux in the core 18 of the piston pump 200, whose direction reverses 50 times per second, alternately clockwise and counterclockwise.

The change of the magnetic flux in the core 18 in turn induces an electric alternating voltage extending annularly around the core 18 and linked to the core 18, in the electrically conductive liquid present in the gap 19. The electric current associated therewith in this liquid induces a magnetic field, which is opposite the magnetic field in the core 18. If the magnetic field in the core 18 is in a clockwise direction, the magnetic field generated by the electric current in the liquid is in a counterclockwise direction and vice versa. An identical Lorentz force is exerted upon each differential volume element of the liquid. This causes a laminar flow without eddies in the communicating vessel, the liquid rising in one leg, while falling in the other leg. Thus, this system acts as a piston pump or piston machine comprising a liquid piston.

The heat generated in the compression (illustrated in more detail below) is dissipated or heat required in generator operation is supplied in that the piston liquid is continuously circulated during the operation and driven through the heat exchanger 16. The continuous circulation of the piston liquid in a circuit avoids that always the same molecules of the liquid are on the border between the piston and the air. Circulation of the piston liquid is achieved in that the gap 19 filled with an electrically conductive liquid is divided into two concentric gaps 22, 23 by the concentric partition wall 21, apart from FIG. 3 see also FIG. 4. These gaps 22, 23 are connected only at the upper end of the piston displacement 29 of the two "pistons", so that the piston liquid may pass from the internal gap 22 into the external gap 23 (and vice versa). The piston volume heated in pumping operation (or cooled in generator operation) is exchanged in each working period (i.e. 50 times per second) by the circulating pump 15. The small circulating pump 15 works in the same way as the large circulating pump (cf. FIGS. 6 to 10) by induction, only on a smaller scale. It sucks the piston liquid from the external gap 23 downwards, continuously drives it through the heat exchangers 12, 16 and then from below, on the lower vertex 17, again into the internal gap 22.

Once the compressed heated air has run past the opened pressure valve 30 (FIGS. 6, 7), it is directed through the heat accumulator 3 in the pressure pipeline 7, enabling it to dissipate its heat. Vice versa, the air entering from the compressed air energy storage 2 may absorb heat from the heat accumulator 3, prior to expanding and cooling down in the piston displacement 29 of the system then functioning as a generator.

To keep the power input in pumping operation (charging operation) constant, the volume of the piston displacement 29 is controlled. In the case of a low working pressure (e.g. 100 bar), the piston liquid level is low, consequently the piston displacement 29 is large. In the case of a high working pressure (e.g. 1000 bar), the piston liquid level is high, consequently the piston displacement 29 is low. The piston displacement volume is controlled by the element 12 functioning as volume controller, and as mentioned above, said element has its interior divided into the middle (inner) region 13 and the two outer regions 14 by the two membrane springs 11 (see FIG. 2). The membrane springs 11 bulge when the pressure rises in the middle region 13. The hydraulic liquid 10 is contained in this region 13, whose pressure is readjusted proportionally to the working pressure with the aid of the pressure transducer 9. The piston liquid is contained in the outer regions 14 of the disk-shaped element 12, which liquid is partially displaced out of the regions 14 when the membrane springs bulge, thus reducing the volume in the region 14. When the working pressure rises, the piston liquid is forced from chamber 14 through opening 17 and into the gap 19, thus reducing the piston displacement 29. The spring characteristic and the dimensions of the membrane springs 11 are preferably selected in such a way that the piston displacement 29 is controlled by the working pressure in such a way that the power input is constant in pumping operation.

Thus, the system may work as a pump or as a generator. In pumping operation, electrical energy is used to perform compression work in the piston displacement 29 above the liquid level. The air enclosed in the piston displacement 29 is compressed until the pressure is higher than the pressure in the compressed air energy storage 2. Thus, the pressure valve 30 (cf. FIGS. 6 and 7) above the piston liquid is opened against the force of the spring 32, and the compressed air flows into the compressed air energy storage 2 via the pressure pipeline 7. In pumping operation, the pressure difference alone suffices to open the pressure valve 30, the pressure in the piston displacement 29 overcoming the force of the spring 32, which again closes the pressure valve 30 after the stroke.

While air is compressed in one "cylinder", the other cylinder sucks in fresh air from the outside in that the negative pressure caused in the piston displacement 29 of the other cylinder opens the suction valve 31 against the force of the spring 33 (cf. FIG. 8).

In generator operation, an excitation voltage is applied to the terminals 4 from outside. Said excitation voltage may be provided by the mains, with which the compressed air energy storage unit of the present type works in interconnected operation. In the event of a power failure, the excitation voltage may be generated by a self-sufficient conventional system (e.g. diesel generator plus transformer). Several (e.g. eight) electromagnets 34 open the pressure valve 30 by overcoming the force of the spring 32. When the voltage across the magnets 34 is switched off, the force of the spring 32, together with the force of gravity, closes (lowers) the pressure valve 30. While in one cylinder the magnets 34 open the pressure valve 30, several (e.g. eight) electromagnets 35 open the suction valve 31 in the other cylinder, to release the processed air to the outside at atmospheric pressure (cf. pipeline 8), by overcoming the force of the spring 33 and pressing the suction valve 31 downwards. When the voltage across the magnets 35 is switched off, the force of the spring closes (lifts) the suction valve 31, which will then be closed. Rectifiers (not shown) may each suppress a half-wave of each period of the sinus-shaped alternating voltage on the electromagnets 34 and 35. For example, the first half-wave of each sine period is applied on the electromagnets, which open the right pressure valve and the left suction valve, while the second half-wave of each sine period is applied on the electromagnets, which open the left pressure valve and the right suction valve. The process of opening and closing is performed by lifting and lowering the valves 30, 31 synchronously with the excitation voltage 50 times per second. The entering pressurized air performs mechanical work in generator operation, to overcome the electromagnetic resistance. Thereby, a current flow will occur on the outer terminals, which is opposed to the electrical excitation voltage at that point. Thus, a voltage source is provided, which can deliver electrical power to the outside.

In generator operation, the electromagnets thus open the pressure valve 30, to allow compressed air to enter from the compressed air reservoir 2 and into the piston displacement 29 of the cylinder, or the electromagnets 35 lower the suction valve 31, to allow air to be blown out to the atmosphere at atmspheric pressure after the work cycle.

The chamber 36 above the pressure valve 30 is connected to the pressure of the compressed air reservoir 2 or the atmospheric pressure, depending on the mode of operation.

For the machine to be able to work as either a pump or a generator, it is necessary that the air chamber 36 (cf. FIG. 6) above the pressure valve 30 is selectively connected to the working pressure (e.g. 100-1000 bar) or to the atmospheric pressure (1 bar). In pumping operation, the air chamber 36 above the pressure valve 30 is connected to the working pressure in the compressed air reservoir 2. The pressure valve 30 opens against the force of the spring not until the pressure in the piston, i.e. the piston displacement 29, is higher. In generator operation, the air chamber 36 above the pressure valve 30, however, must be connected to the atmospheric pressure (pipeline 8), since otherwise the electromagnet 34 would not manage to lift the pressure valve 30.

Switching between the modes of operation is effected at the instance of a program and controlled by the power plant process control always in two steps: First, the chamber 36 is separated from the chamber, to which it was connected (a frusto-conical element 28 closes). Subsequently, it is connected to the chamber 8' or 7' (cf. FIG. 6), to which it was not connected so far (the other frusto-conical element 28 opens). During the switching process, compressed air and thus energy gets lost, which is proportional to the volume of the chamber 36. Therefore, this chamber 36 is kept as small as possible. The chamber 36 is separated from the working storage 7' or the ambient air 8' in each case by one of the frusto-conical elements 28 in the center of the corresponding disk 27 comprising a thread on its outer surface. The frusto-conical element 28 is pressed into a frusto-conical opening. This is done by a servomotor 25 each (cf. FIG. 3), which rotates the disk 27 (carrying the frusto-conical closure) via a planetary gear 26, so that the thread on its outer surface glides in a corresponding thread on the inner side of the switching device 24, just like a screw in a nut. In terms of number of turns, pitch, static friction coefficient, etc., the thread is designed with regard to the aperture of the closure in such a way that the maximum working pressure against the atmospheric pressure is reliably sealed off, in short, the static friction and the number of turns of the external thread of the large disks 27 reliably seal off the maximum pressure against the atmospheric pressure.

The reactive power remains in the plant. It oscillates between capacity and inductivity. From the outside, active power is supplied only to the equivalent resistance, or active power is produced by the equivalent voltage source.

To minimize the eddy current losses and the losses due to reversed magnetization, all mechanically fixed parts, with the exception of the coil windings 6 and 15, the core 18 and of 15 and of the electromagnetic valve control (34, 35) are made of an electrically non-conductive material (e.g. ceramics). This also includes the mechanical support or suspension (not shown in the drawing) of the machine. Alternatively, the suspension may be made of wood or brick masonry.

Figure 11:
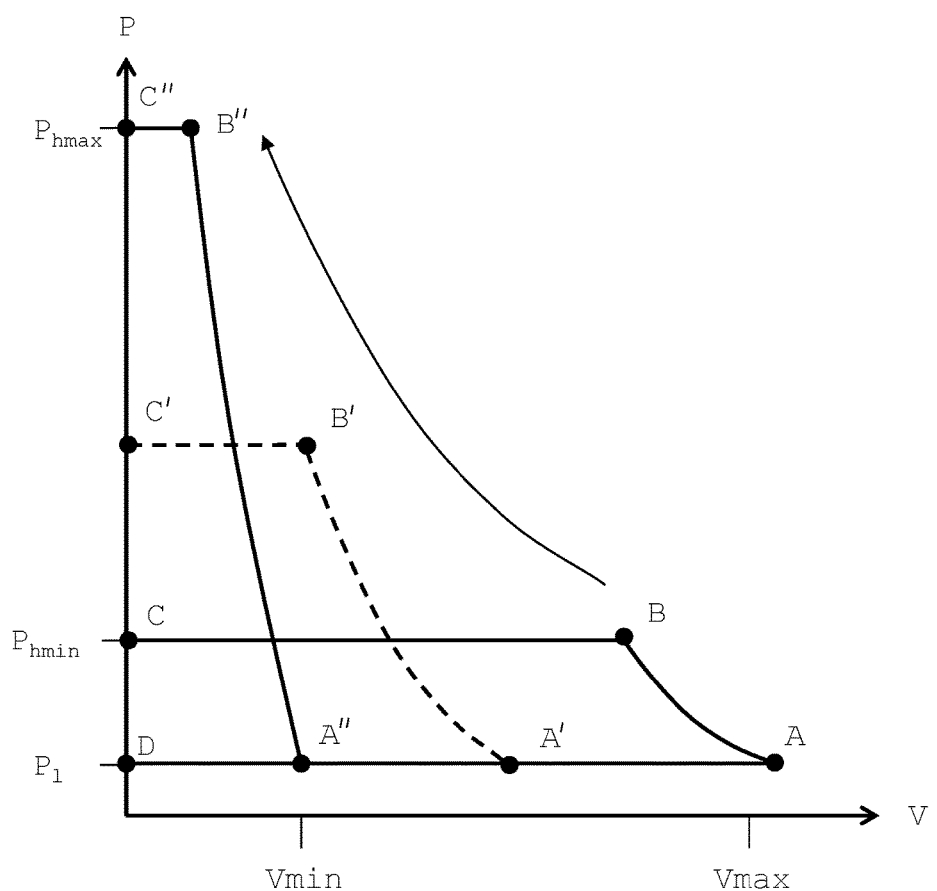
FIG. 11 is a schematic diagram of a thermodynamic cycle process.

The described system is a thermal engine. The thermodynamic cycle process is shown in FIG. 11. In general, the individual operating steps are as follows:

Polytropic compression (A-B)
Isobaric compression (B-C)
Isochoric change in pressure (C-D)
Isobaric expansion (D-A)

In the case of a low pressure p1 (=1 bar), the volume V is controlled such that the surface integral of the cycle process (work per piston stroke) is kept constant during the charging of the compressed air reservoir 2 in pumping operation, with continuously increasing the working pressure from Phmin (e.g. 100 bar) to Phmax (e.g. 1000 bar), and consequently the piston pump 200 absorbs a constant electric power. The rectangle, through which the cycle process moves, changes its shape, but not its area during the charging process. At the beginning of the charging process it is broad and low (A-B-C-D), during the charging process it will become narrower (A'-B'-C'-D') and higher, at the end it is narrowest and highest (A"-B"-C"-D"), as is shown in FIG. 11.

During the discharge of the compressed air reservoir 2 in generator operation, the working pressure of the compressed air reservoir 2 decreases continuously. To keep the power constant in generator operation, the working pressure—e.g. with the help of a throttle valve not shown in the drawing—is throttled down to a fixed value (e.g. 100 bar). The rectangle, which is passed through during the cycle process, always has the same shape.

The heat transition between the piston displacement 29 and the atmosphere may be varied by making a suitable choice of the construction and/or the operating parameters, so that the polytropic process of compression/expansion more or less approximates an isothermal process and thus the efficiency of the system may be improved to a greater or lesser extent. A higher degree of efficiency may be obtained by, among other things, a lower power/longer charge cycles, or vice versa.

Figure 12:
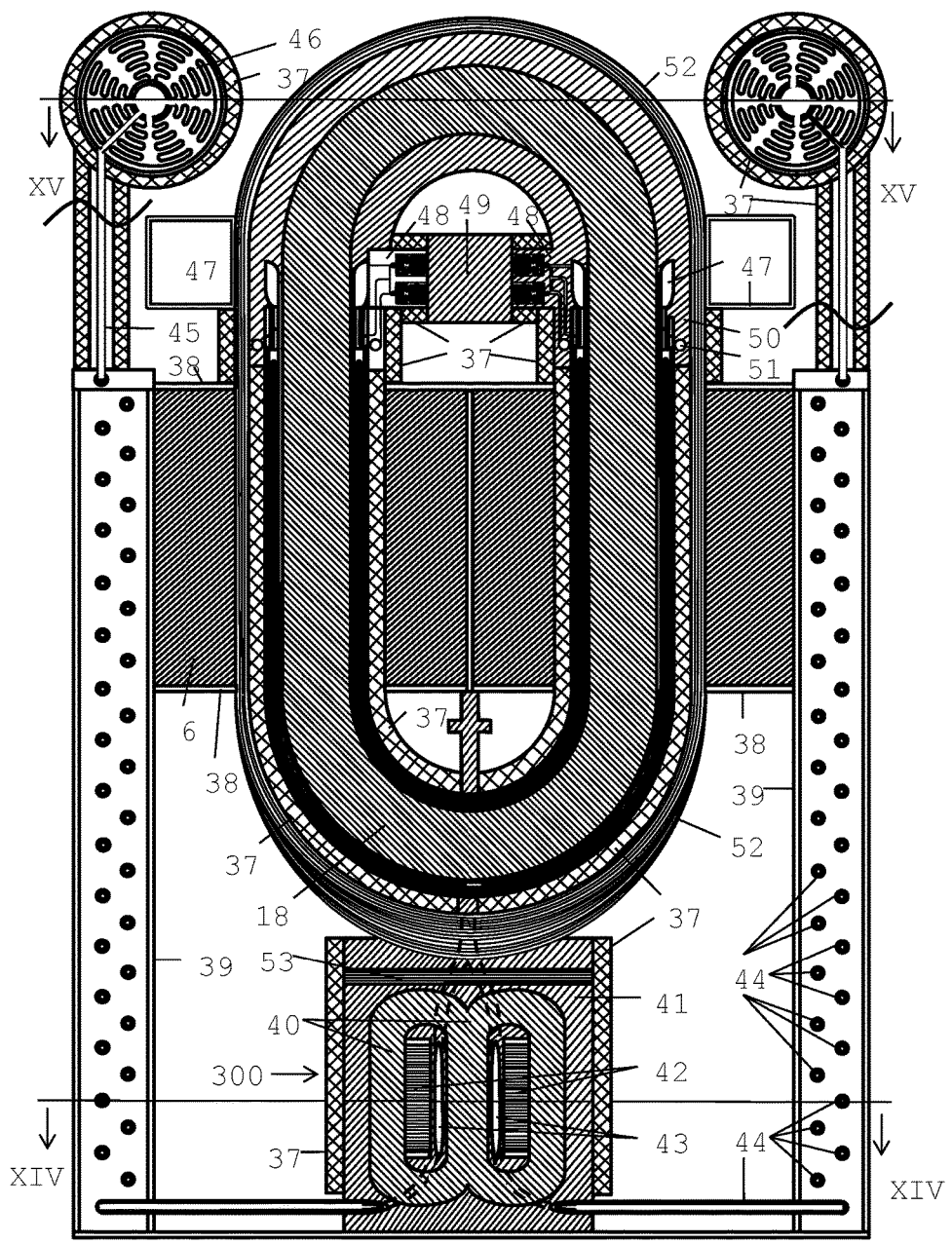
FIG. 12 is a view of the machine of compact design.

FIG. 12 shows a view of the machine in compact design. All pressure-carrying parts of the plant are designed such that they may be wrapped with several layers (e.g. 40-60 layers) of fibers (e.g. glass fibers, ceramic fibers or basalt fibers). In the production, after each layer of fiber wrapping, it is provided to apply a hardening matrix (e.g. concrete in the case of glass fiber windings, or a silicon carbide matrix in the case of silicon carbide fibers), which fills the spaces between the fibers and combines to the underlying layer during hardening. The cross-sections of the multi-layered windings 37 are indicated in cross-hatched manner. A box-type component 38 is firmly attached to the machine and to the four outer main pillars 39. The box 39 surrounds and carries the electric coils 6. A circulating pump 300 is located centrally below the machine and is fixed thereto. It consists of a soft-magnetic core 40, which is potted in a matrix 41, of an electric coil 42, which is wound around the inner part of the core 40, and of a gap 43 between the inner part of the core 40 and the electric coil 42. The inner part of the magnetic core 40 is divided into four branches, similar to a four-leaf clover. The magnetic field lines close along these four branches (cf. also FIG. 14). The course of the magnetic field lines of the circulating pump 300 is similar to the jets of a four-jet fountain. Upwards and downwards, the gap 43 is likewise divided into four branches, so that the piston liquid may flow between the four branches of the magnetic core in four partial streams. The four partial streams of the piston liquid enter the helical heat exchanger 44 at the lower end of the circulating pump, flow to the outside and then—supported by the main pillars 39—in four separate external spirals upwards up to a turning point and from there into four separate internal spirals downwards again, until they leave again the area of the main pillars in inward direction and enter the machine at the bottom end. The turning point is not quite at the upper end of the main pillars 39, but below. There are a few spirals above this turning point, which run into the conduit 45 to the piston displacement controller 46, just like a "dead-end street". The control volume of the piston liquid is in this "dead-end-street". A hydraulic liquid having a considerably smaller specific weight floats on this control volume. The hydraulic liquid also fills the inner compressible area of the piston displacement controller 46. The region 47 connects the suction valve to the ambient air. It consists of an inner and an outer region. The outer region 47 is a broad pipeline annularly extending about the magnetic core. Between the inner and outer region 47, the air passes through vertical parallel slots in the massive ceramic element 50. The switching device 48 for switching between pumping operation and generator operation is designed in such a way that it fits into a cylinder and may be wrapped with fibers. The cylinder is a massive ceramic component, in which two large bores and some thin pipelines are left free. Each bore is provided with an electric servomotor, a planetary gear, and a frusto-conical closure. A massive block 49 is located in the center of the switching device, which block is inserted after the assembly of the servomotors, to provide resistance to the working pressure in the cavities of the switching device to the right and to the left. The transport of the compressed air to and from the machine takes place via an annular pipeline 51, which is kept free as an annular cavity in the interior of the massive ceramic element 51. The stadium-shaped body of the machine is externally wrapped with several layers of ropes 52 (e.g. made of glass fiber, ceramic fiber, or basalt fiber) in parallel to the center line, which are embedded in a hardened matrix (e.g. concrete or silicon carbide). Below the rotor winding 52, a component 53 is inserted, which closes the gap, through which the rope was threaded during the winding process. The ropes 52 absorb the tensile stress caused between the partial areas above and below the piston displacement during operation.

Figure 13:
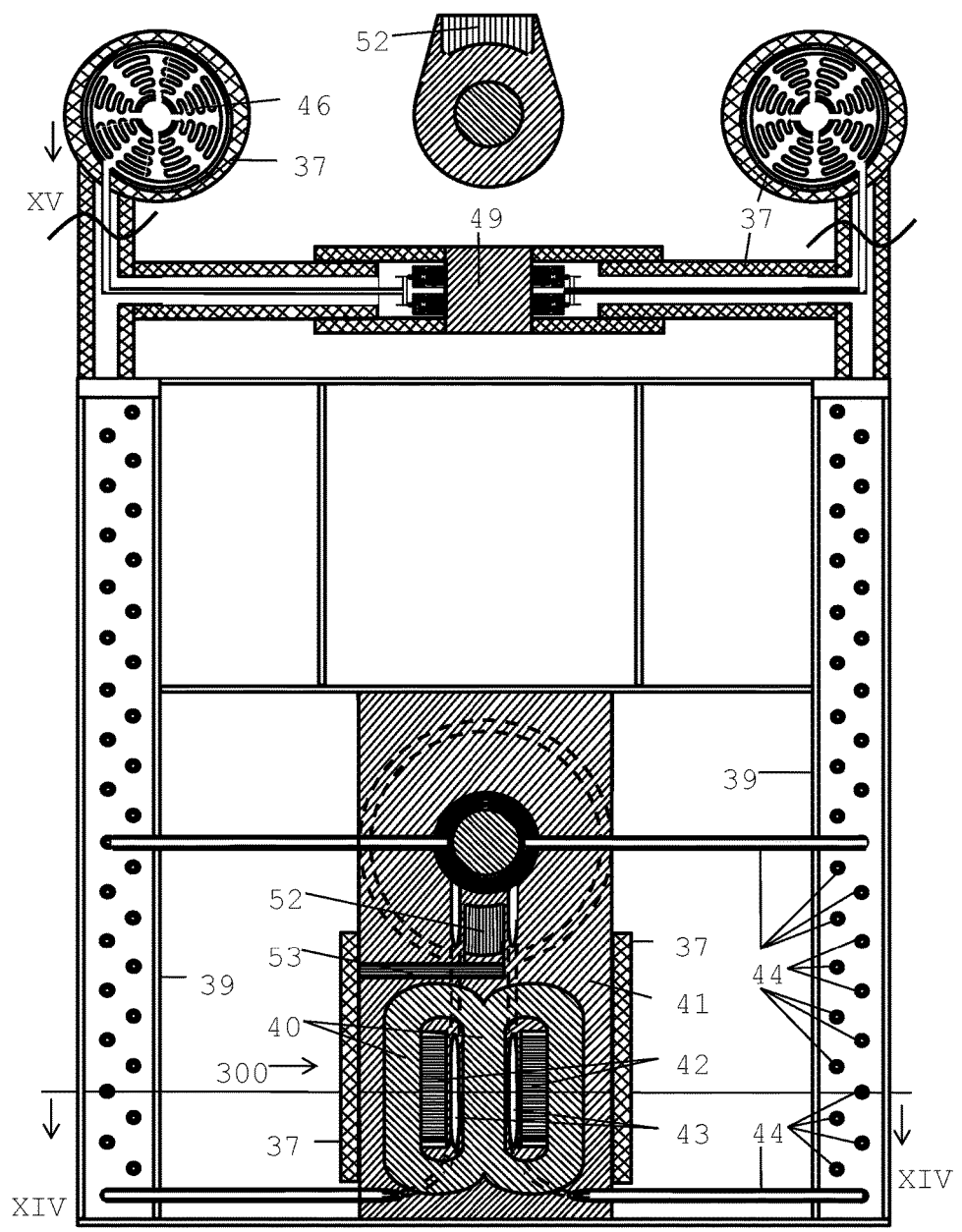
FIG. 13 is a view rotated by about 90° as compared to FIG. 12.

FIG. 13 is also a view of the machine in compact design; however, the view is rotated by 90° as compared to FIG. 12. At that point in FIG. 12 where the switching device between pumping operation and generator operation is shown, FIG. 13 shows a switching device of a similar design. It serves for optional connection of the piston displacement controller to the working pressure or to the atmospheric pressure.

Figure 14:
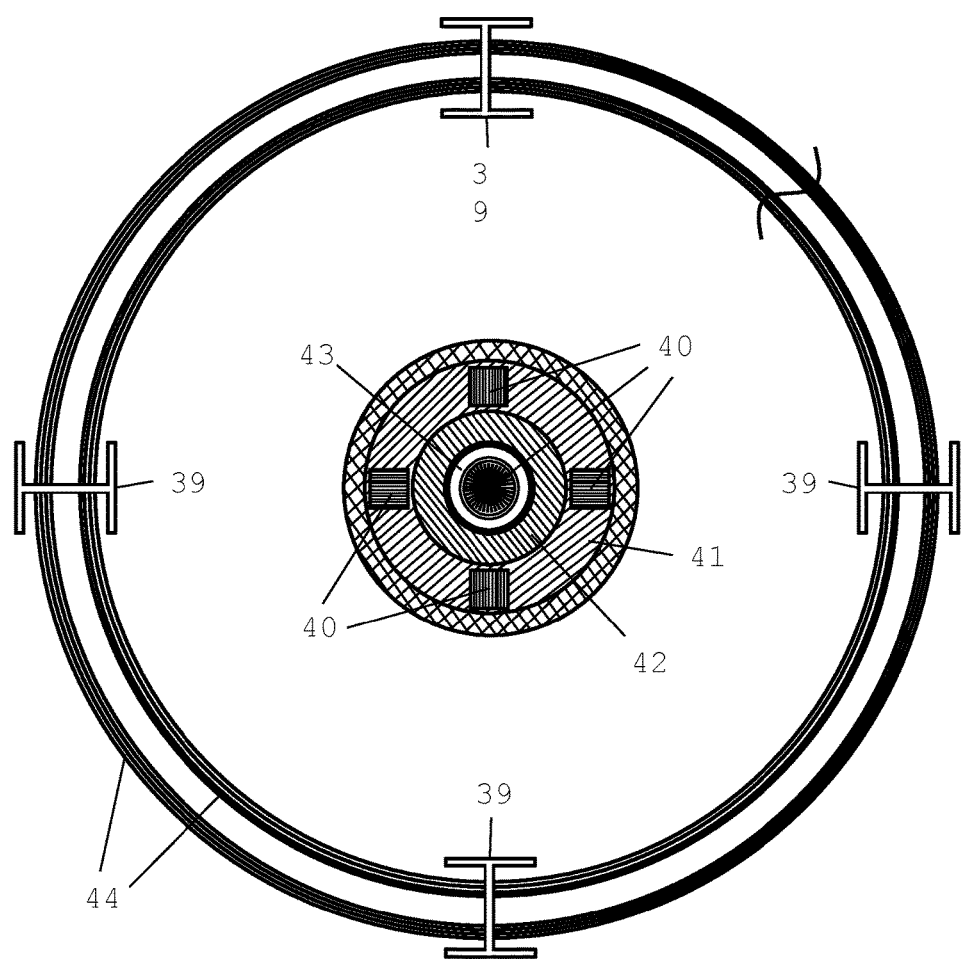
FIG. 14 is a cross-section of the compact circulation pump centrally arranged below the machine, as well as of the four supports including the helical heat exchanger.

FIG. 14 shows a cross-section of the circulating pump. The magnetic core 40 having a star-shaped cross-section is located in the middle. To the outside, the magnetic core is divided into four branches having a cross-section of parallel fins (similar to a layered transformer plate). The magnetic field lines close along these four branches (cf. FIG. 12 and FIG. 13). The core 40 is potted in a ceramic element 41. The electric coil 42 of the circulating pump is located around the inner core. The element 41 is not compact prior to winding the electric 42 coil, but merely surrounds the four branches 40 of the magnetic core. It is open there between and leaves access to a cavity, which is then filled with the electric wire of the winding 42. After producing the winding 42, the remaining free spaces of the elements 41 are filled, so that a compact element is produced and the winding 42 is no longer accessible from the outside. An annular gap is left free between the coils 42 and the magnetic core 40, through which gap the piston liquid flows. Upwards and downwards, this annular gap 43 is divided into four branches, which vertically extend between the branches of the magnetic core in a manner offset by 45°. At the bottom, the four branches open into four conduits, which radially lead outwards to the four main pillars 39. From there, the four conduits spiral upwards.

Figure 15:
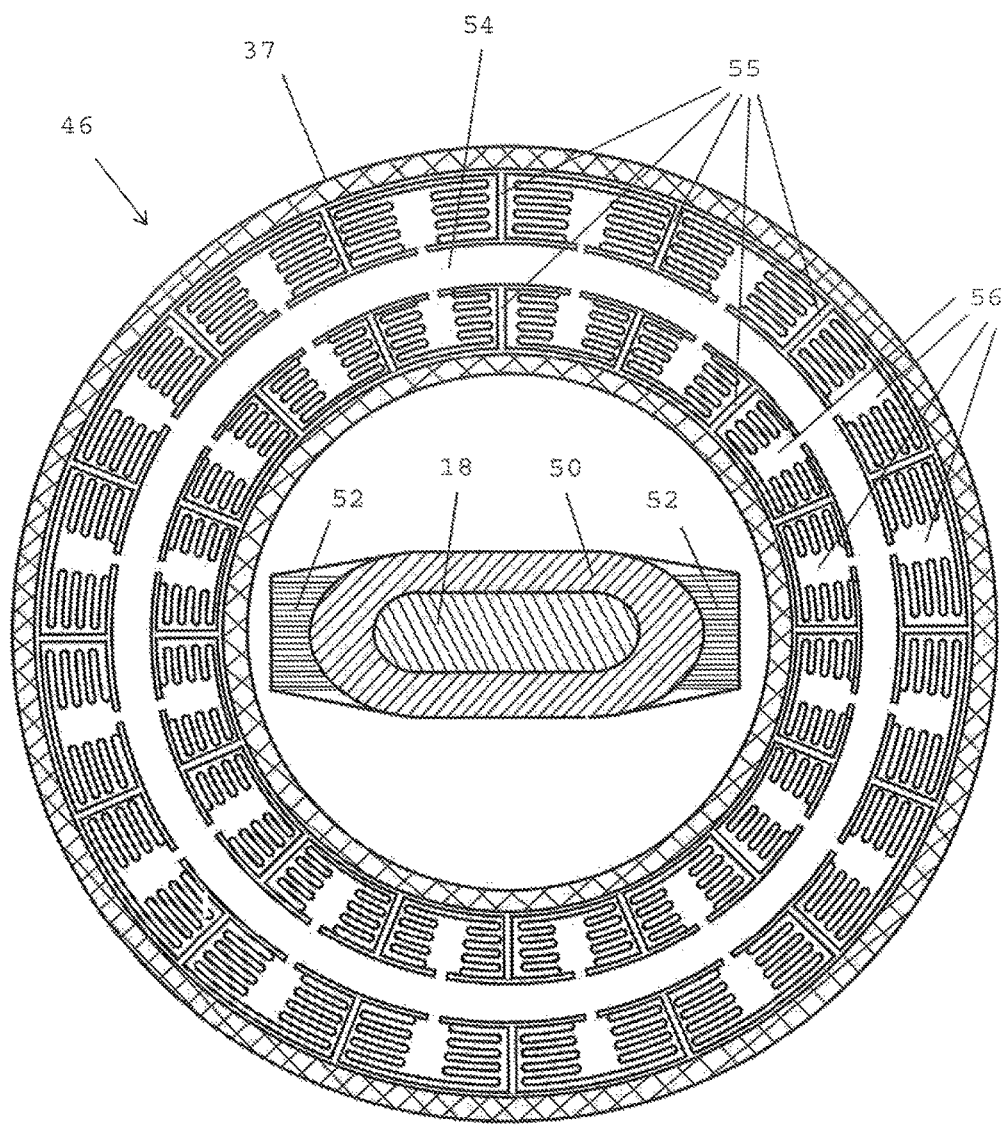
FIG. 15 is a cross-section of the improved piston displacement controller.

FIG. 15 shows a cross-section of the improved piston displacement controller 46. In contrast to the basic patent, it is not designed as a discus, but as a torus. This has the advantage of that it may be wrapped with fibers 37, to better withstand tensile stress. An inner ring conduit 54 runs along the axis of the torus 46. Partition walls 55 subdivide the area outside the loop conduit 54 into segments. Each segment contains an elastically compressible volume 56, whose edge has a similar shape as a bellows or an accordion. The volumes 56 are open towards the inside to the loop conduit 54. The loop conduit 54, for its part, is connected to the upper end of the helical heat sink via the perpendicular conduit 45, which heat sink accommodates the piston liquid. Both the loop conduit 64 and the volumes 56 are filled with hydraulic oil. Due to its lower specific weight, the hydraulic oil floats on the piston liquid. The chamber outside the bellows 56 is filled with air. During operation, this air chamber is connected to the working pressure and compresses the bellows 56 to a greater or lesser extent, depending on the working pressure. Thus, a larger or lesser amount of hydraulic oil is pressed downwards through the conduit 45, which again controls the level of the piston liquid and hence the piston displacement in the machine.

Figure 16:
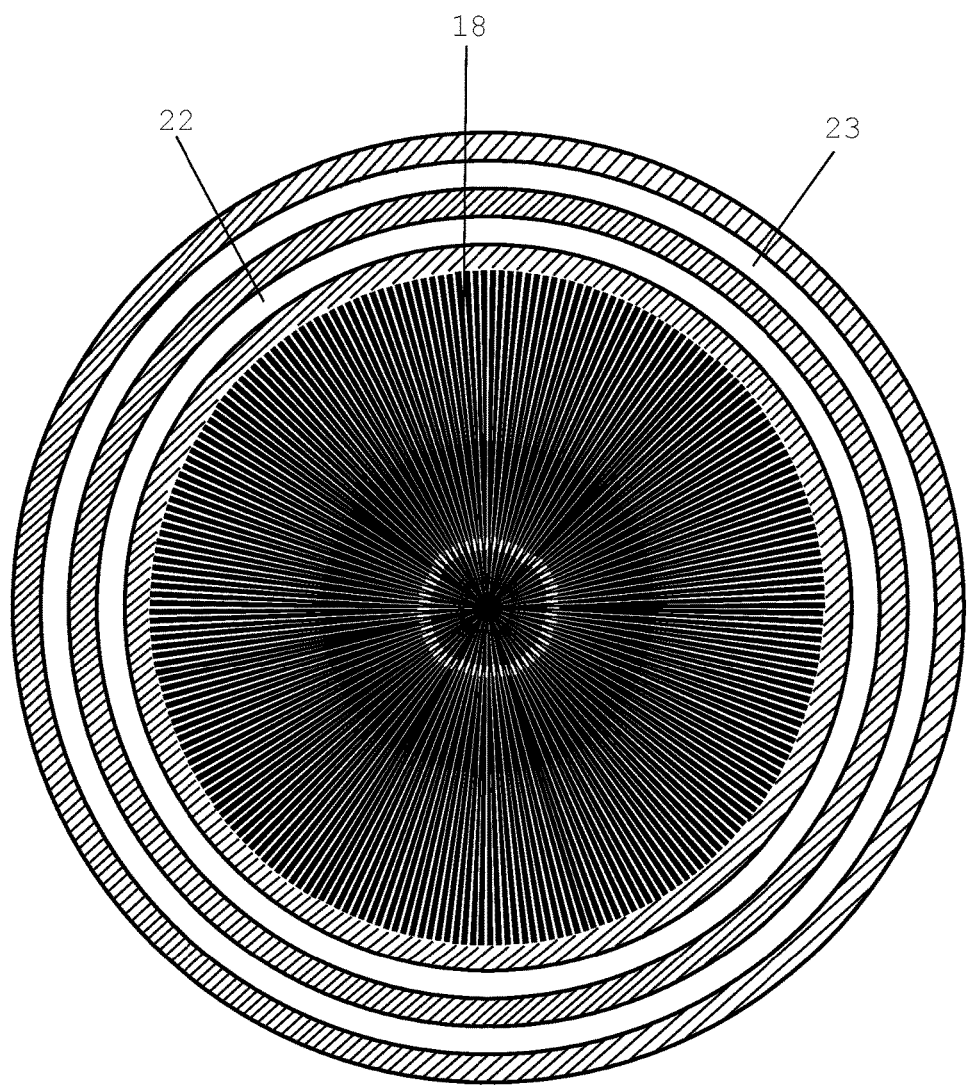
FIG. 16 is a cross-section of a leg of the machine comprising the star-shaped magnetic core.

FIG. 16 shows a cross-section of an arm of the machine. The magnetic core 18 is not wound, but integrally potted in a cavity of the ceramic element. To minimize losses, the core is star-shaped. During the manufacturing process, a star-shaped cavity was left free in the interior of the ceramic component for this purpose. Furthermore, the inner gap 22 and the outer gap 23 are shown.

Figure 17:
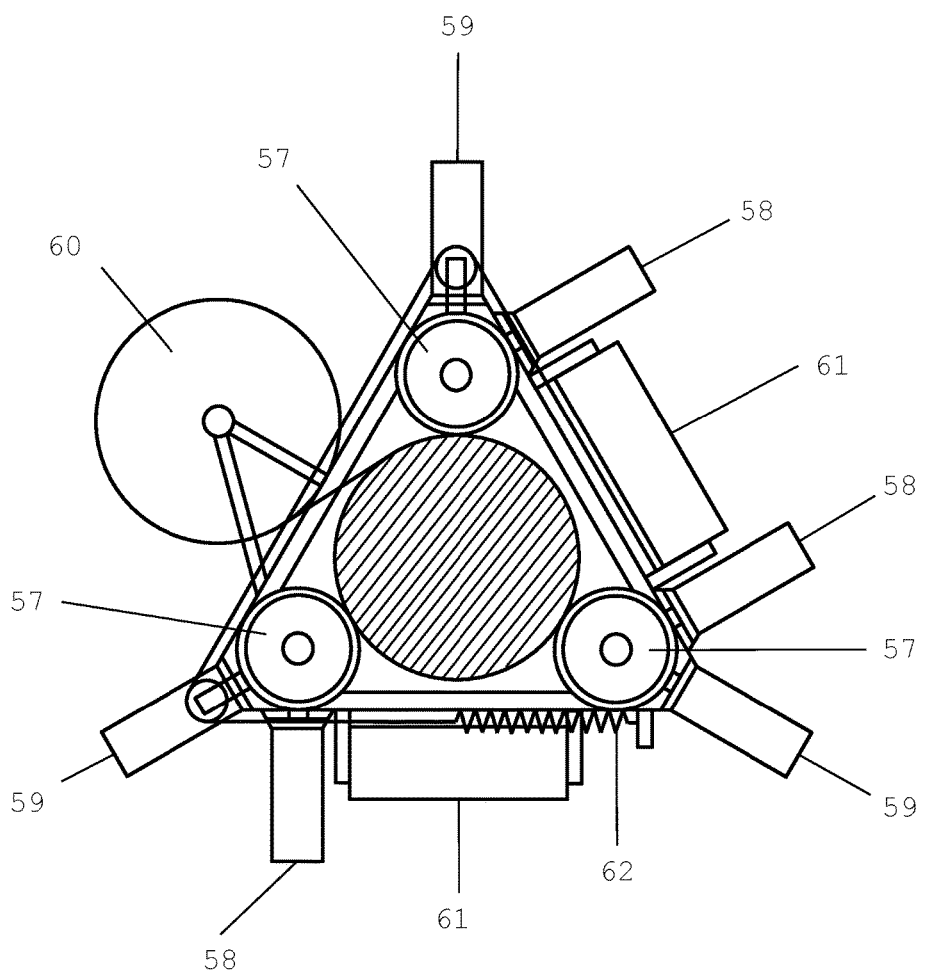
FIG. 17 is the schematic view of a possible design of the coiling machine.

FIG. 17 shows an embodiment of a coiling machine for wrapping the pressure-carrying parts with fibers. In the shown example, the coiling machine is designed in the form of a triangle. However, its design might also be a rectangle, in general a polygon or a ring. In particular, it might be open on one side and designed in the shape of pliers. In the present case, however, not only wrapping but also the manufacture of a fiber tissue with the aid of a second—not shown—machine in the nature of a mechanical loom would be possible. The shown coiling machine has 6 wheels in the form of three pairs of wheels 57 firmly resting on the tube to be wrapped. Each pair of wheels 57 is connected to two electric motors via gears, which motors are remote-controlled wirelessly. The motors may each include a SIM card and be controlled via mobile communication (machine-to-machine). One of the two motors 58 drives the pair of wheels, the other (servo) motor 59 controls it. The control may be geared down by a transmission located between the servomotor 59 and the pair of wheels 57. To be able to wrap a curved torus in a uniform manner, all pairs of wheels must be controlled independently of one another in a different manner. The fiber is wound on a roll 60 firmly connected to the coiling machine. The fiber is wound off this roll during the winding process. Two accumulators 61 supply the necessary energy. The sides of the triangle are variable in length, to match different cross-sections. An adjustable spring 62 or a spindle (not shown) ensures the necessary constant contact pressure of the pairs of wheels on the surface of the tube.

Figure 18:
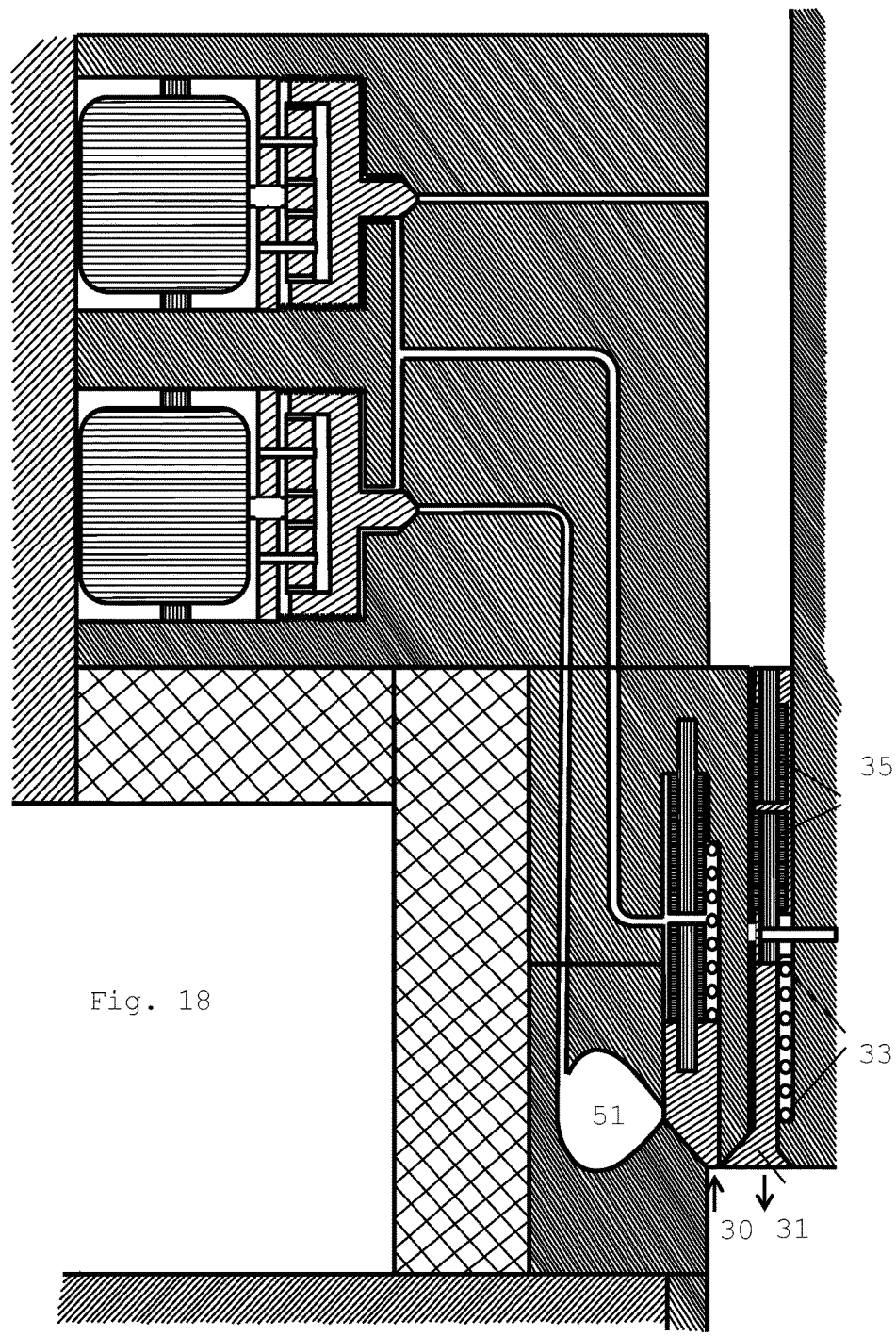
FIG. 18 is an enlarged view of the improved switching device.

FIG. 18 shows the switching device. It comprises two horizontal, cylinder-shaped extensions extending from the stadium-shaped body of the machine towards the interior. In these extensions, two cylinder-shaped cavities are each left free, which are arranged one on top of the other. They are connected to one another as well as to the working pressure, to the atmospheric pressure and to the chamber above the pressure valve via thin conduits. These thin conduits serve—similar to the Eustachian tube in the human ear—the pressure compensation. A servomotor is located in both borings, which moves a frusto-conical closure via a planetary gear. When switching between pumping operation and generator operation, the chamber above the pressure valve must be selectively connected to either the working pressure or the atmospheric pressure. FIG. 18 shows both valves in closed position.

Figure 19:
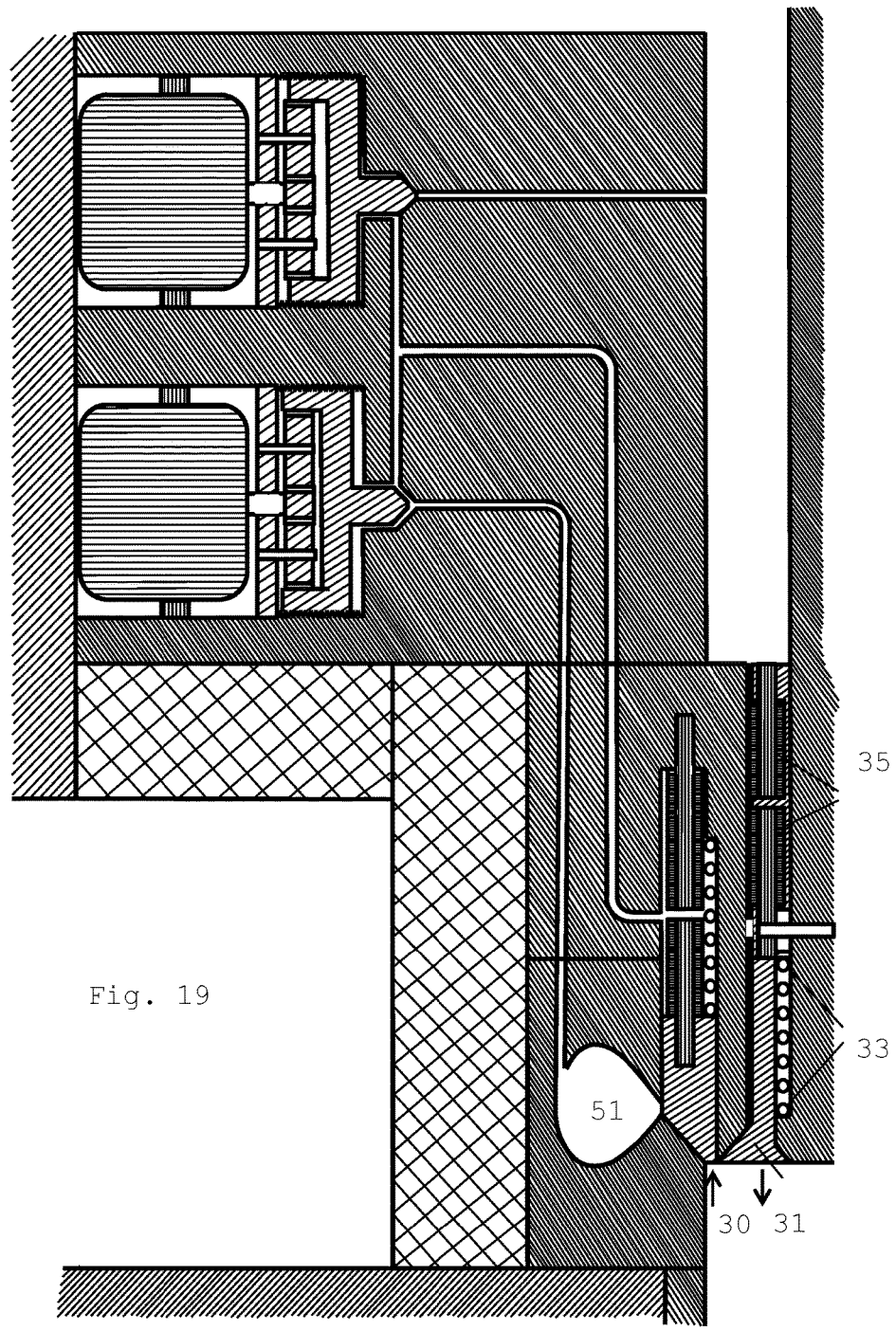
FIG. 19 just like FIG. 18, however, with the lower valve being in an open position.

FIG. 19 shows the same arrangement as FIG. 18, however, with the lower valve being in open position. The chamber above the pressure valve is now connected to the working pressure. The machine is in pumping operation. Both cavities in the switching device are likewise connected to the working pressure.

Figure 20:
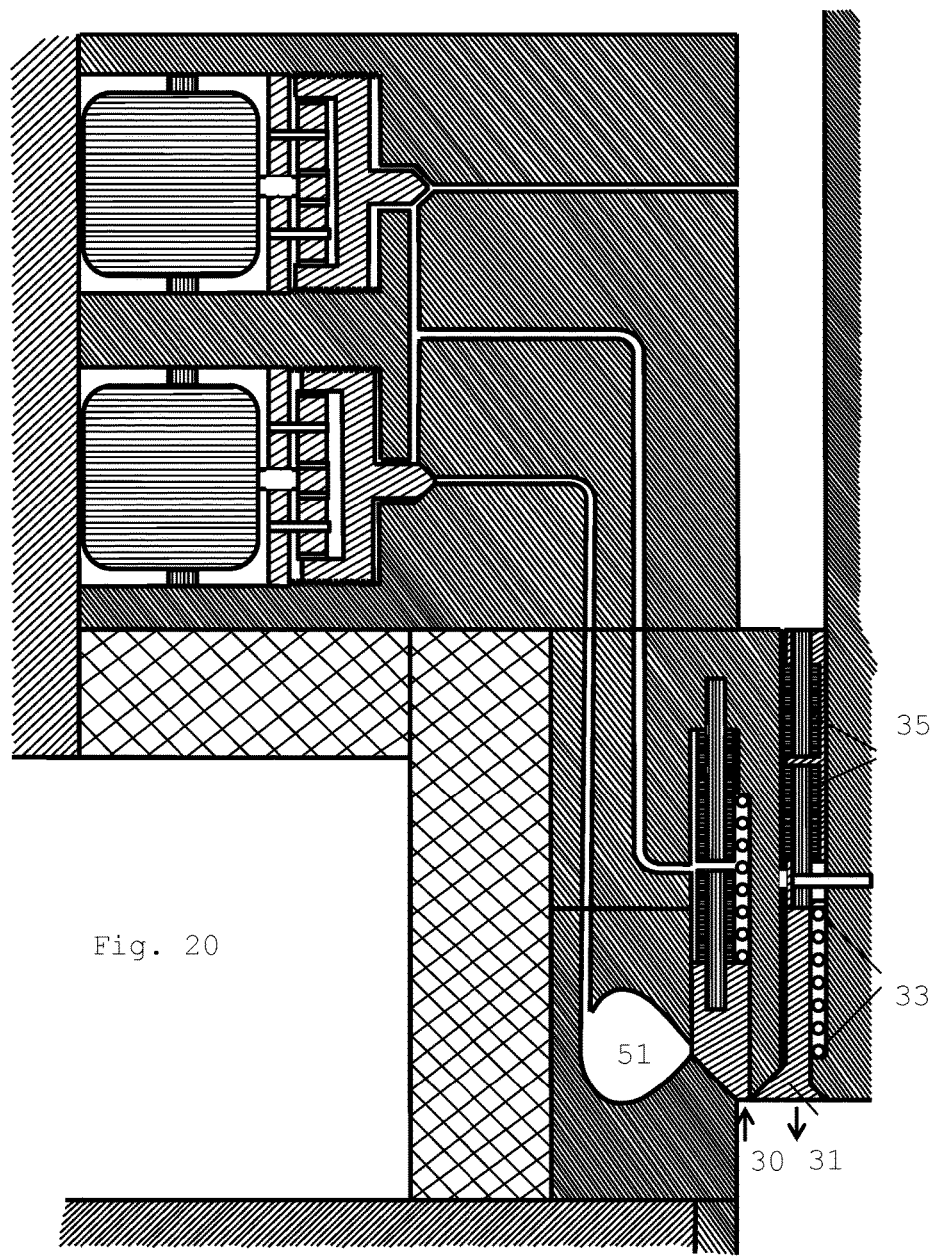
FIG. 20 just like FIG. 18, however, with the upper valve being in an open position.

FIG. 20 shows the same arrangement as FIG. 18, however, with the upper valve being in an open position. The chamber above the pressure valve is now connected to the atmospheric pressure. The machine is in generator operation. Both cavities in the switching device are likewise connected to the atmospheric pressure.

In particular, the switching device is characterized in that the two larger cavities, in which the servomotors are arranged, always have the same pressure—either working pressure or atmospheric pressure. Thus, stresses in the interior of the switching device are avoided.

Figure 21:
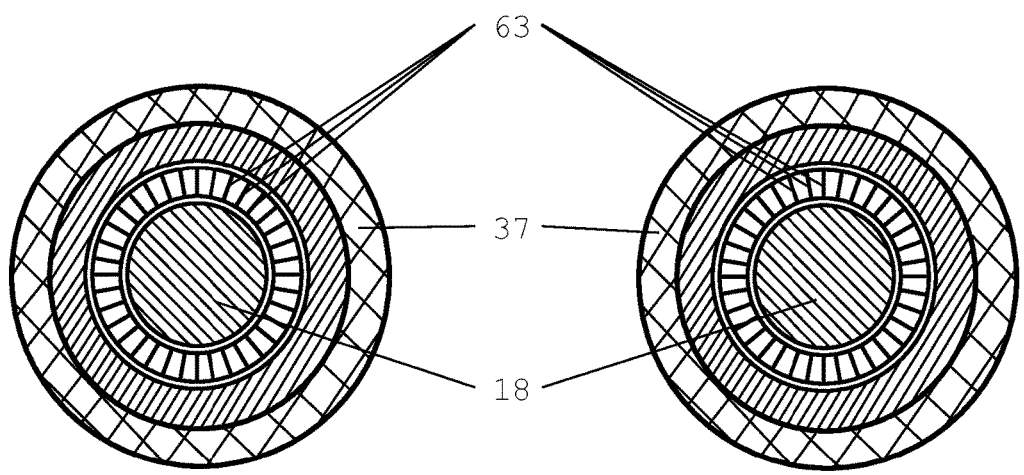
FIG. 21 is a cross-section of the machine on the level of the piston displacement having heat exchanger fins arranged in a star-shaped manner.

FIG. 21 shows a device for improving the efficiency of the machine: Star-shaped perpendicular fins 63 are arranged in the piston displacement. They extend upwards up to the valves and downwards up to where they are always immersed in the piston liquid, however, not up to under the upper edge of the electric main coils 6, since otherwise the annular current flow in the piston liquid would be interrupted. The fins 63 should have a high thermal conductivity and a high thermal capacity. The more fins in the piston displacement, the larger the surface, and thus the heat transition between the air and the piston liquid will improve. The thermodynamic process becomes less adiabatic and more isothermal, in particular if the air is compressed and expanded several times in the piston displacement, prior to flowing over the opened pressure valve in the accumulator.

The material of the fins may consist of e.g. ceramics and, for example, it may be the same material as the compact ceramic element. In this case, the fins are produced in a separate operating step when printing the compact ceramic elements and are firmly attached thereto.

The material of the fins may consist of e.g. metal, for example, tungsten. In this case, after the manufacture of the compact ceramic element, the fins are laterally inserted in vertical slots provided for this purpose and subsequently the slots are firmly closed.

The invention claimed is:

1. A compressed air energy storage unit, comprising:
   an electrical input and output circuit;
   an artificially created compressed air reservoir;
   a compressor and expansion device including a piston pump having pistons
   formed of an electrically and thermally conductive liquid, said piston pump being switchable between a pumping operation and a generator operation; and
   electromagnets including a core and coils to inductively drive said conductive liquid, said core forming a closed loop including two parallel straight cylinder parts, and said coils being wound around said parallel straight cylinder parts.

2. The compressed air energy storage unit according to claim 1, wherein said core and said coils define a gap remaining free therebetween, and said conductive liquid moves up and down in said gap to form a communicating vessel.

3. The compressed air energy storage unit according to claim 2, which further comprises:
   a partition wall dividing said gap between said core and said coils into an internal gap located closer to said core and an external gap located closer to said coils;
   said two parallel straight cylinder parts having upper ends; and
   said partition wall terminating at said two upper ends of said parallel straight cylinder parts, permitting said conductive liquid to flow from one of said gaps into the other of said gaps, forming a piston displacement.

4. The compressed air energy storage unit according to claim 1, wherein said piston pump has a cylinder chamber forming a piston displacement, said conductive liquid has a volume being controllable in said cylinder chamber, and a power input being constant during a compressed-air storage.

5. The compressed air energy storage unit according to claim 4, which further comprises:
   a reservoir being in communication with said conductive liquid and having a volume;
   a reduction pressure transducer and a hydraulic liquid varying said volume of said reservoir in communication with said conductive liquid in dependence on an air pressure in said compressed air reservoir; and
   at least one resilient boundary surface or a membrane having one side against which said hydraulic liquid presses and another side at which said reservoir in communication with said conductive liquid is located.

6. The compressed air energy storage unit according to claim 1, wherein said piston pump is completely immersed in a liquid or water acting as a heat accumulator.

7. The compressed air energy storage unit according to claim 6, which further comprises at least one circulating pump for constantly circulating said conductive liquid in a closed circulation during operation, causing a heat exchange to take place between said conductive liquid and said heat accumulator, wherein said circulating pump is one of two induction circulating pumps each disposed below a respective one of said two parallel straight cylinder parts and carrying out half-strokes each periodically and synchronously sucking off said conductive liquid from said external gap and inductively driving said conductive liquid through said heat exchanger and finally pushing said conductive liquid back into said internal gap.

8. The compressed air energy storage unit according to claim 7, wherein:
said reservoir controlling said volume of said conductive liquid simultaneously acts as a heat exchanger;
said at least one resilient boundary surface or membrane includes two resilient boundary surfaces or membranes;
three mutually adjacent disk-shaped arched chambers include a middle chamber to which said hydraulic liquid is supplied and two reservoir chambers disposed on respective sides of said middle chamber and each being delimited from said middle chamber by a respective one said resilient boundary surfaces or membranes; and
said two reservoir chambers each being formed of an outwardly arched wall made of a material or borosilicate glass having a good thermal conductivity and a high-temperature resistance.

9. The compressed air energy storage unit according to claim 8, wherein said heat exchanger has a lower end and an upper end, said circulating pumps pump-in said conductive liquid at said lower end of said heat exchanger, and a pipeline feeds said cooled conductive liquid or said conductive liquid heated in generator operation back again from said upper end of said heat exchanger to said piston pumps.

10. The compressed air energy storage unit according to claim 1, which further comprises a heat accumulator or liquid heat accumulator and a helical heat exchanger pipeline disposed within said heat accumulator or liquid heat accumulator, said conductive liquid being directed through said helical heat exchanger pipeline, and said helical heat exchanger pipeline being formed of a thermally conductive and high-temperature resistant material or borosilicate glass.

11. The compressed air energy storage unit according to claim 1, which further comprises a heat accumulator and a pressure pipeline extending or meandering through said heat accumulator between said compressed air reservoir and said piston pump, for transferring thermal energy between compressed air and a heat accumulating medium.

12. The compressed air energy storage unit according to claim 11, which further comprises a thermally insulating layer surrounding said compressed air reservoir.

13. The compressed air energy storage unit according to claim 1, which further comprises a pressure valve and a suction valve formed as concentric rings enclosing said core.

14. The compressed air energy storage unit according to claim 1, which further comprises an electric capacitor being connected to said electrical input and output circuit and having a 220 kV electric strength.

15. The compressed air energy storage unit according to claim 1, wherein said electrically and thermally conductive liquid is galinstan.

* * * * *